United States Patent
Igarashi et al.

(10) Patent No.: US 10,355,580 B2
(45) Date of Patent: Jul. 16, 2019

(54) DC-DC CONVERTER WITH PROTECTION CIRCUIT LIMITS

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Takashi Igarashi, Mie (JP); Byeongsu Jeong, Mie (JP); Kazuki Masuda, Mie (JP); Seiji Takahashi, Mie (JP); Takanori Itou, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-Shi, Osaka (JP)

( * ) Notice: Subject to any disclaimer, the term of this patent is extended or adjusted under 35 U.S.C. 154(b) by 0 days.

(21) Appl. No.: 15/754,501

(22) PCT Filed: Aug. 29, 2016

(86) PCT No.: PCT/JP2016/075147
§ 371 (c)(1),
(2) Date: Feb. 22, 2018

(87) PCT Pub. No.: WO2017/038742
PCT Pub. Date: Mar. 9, 2017

(65) Prior Publication Data
US 2018/0254695 A1 Sep. 6, 2018

(30) Foreign Application Priority Data

Sep. 2, 2015 (JP) ................................. 2015-172818
Jul. 4, 2016 (JP) ................................. 2016-132344

(51) Int. Cl.
H02M 1/32 (2007.01)
H02M 3/155 (2006.01)
(Continued)

(52) U.S. Cl.
CPC ............... *H02M 1/32* (2013.01); *H02M 1/36* (2013.01); *H02M 3/155* (2013.01); *H02M 3/156* (2013.01);
(Continued)

(58) Field of Classification Search
CPC ............ H02M 1/32; H02M 1/34; H02M 1/36; H02M 1/38; H02M 1/40;
(Continued)

(56) References Cited

U.S. PATENT DOCUMENTS 5,883,473 A * 3/1999 Li ..................... H05B 41/2855
315/209 R
6,252,357 B1 * 6/2001 Tanaka ............... H05B 41/2985
315/209 R
(Continued)

FOREIGN PATENT DOCUMENTS

JP 2006-020414 A 1/2006
JP 2011-178236 A 9/2011

OTHER PUBLICATIONS

Search Report for PCT/JP2016/075147, dated Sep. 20, 2016.

*Primary Examiner* — Yemane Mehari
(74) *Attorney, Agent, or Firm* — Honigman LLP

(57) ABSTRACT

A DC-DC converter includes a protection function for handling a reverse connection state, and a protection function for handling a predetermined abnormality other than a reverse connection state, while reducing conduction loss. The DC-DC converter includes a first protection circuit unit, and a switching element on a first conductive path of a high-voltage side switches to an OFF state upon a predetermined abnormal state being detected to prevent a current from flowing into a voltage conversion unit. Furthermore, a reverse connection protection circuit unit and a switching element, on a third conductive path between the voltage conversion unit and a reference conductive path, is config- (Continued)

ured to switch to an off state if at least a low-voltage side power supply unit is in a reverse connection state, preventing a current from the reference conductive path. Thus, a current is prevented from flowing toward a power supply that is improperly connected.

11 Claims, 11 Drawing Sheets

(51) Int. Cl.
*H02M 3/158* (2006.01)
*H02M 1/36* (2007.01)
*H02M 3/156* (2006.01)
*H02M 7/48* (2007.01)
*H02M 1/00* (2006.01)

(52) U.S. Cl.
CPC ............ *H02M 3/1584* (2013.01); *H02M 7/48* (2013.01); *H02M 2001/0009* (2013.01); *H02M 2003/1586* (2013.01)

(58) Field of Classification Search
CPC ......... H02M 3/156–158; H02M 3/335; H02M 3/33507; H02M 3/33523; H02M 3/3372; H02M 7/48; H02M 7/227; H02M 7/53803; H02M 7/53806
USPC ................................ 363/52–55, 56.01–56.12
See application file for complete search history.

(56) References Cited

U.S. PATENT DOCUMENTS

| | | | | |
|---|---|---|---|---|
| 7,525,261 | B2* | 4/2009 | Van Zundert | H05B 41/2886 315/209 R |
| 8,903,263 | B2* | 12/2014 | Matsumoto | G03G 15/5004 323/282 |
| 2006/0171182 | A1* | 8/2006 | Siri | H02M 3/33592 363/131 |
| 2008/0037295 | A1* | 2/2008 | Suzuki | H02H 7/1227 363/40 |
| 2013/0279219 | A1* | 10/2013 | Oki | H02M 1/32 363/53 |

* cited by examiner

DC-DC CONVERTER WITH PROTECTION CIRCUIT LIMITS

This application is the U.S. national stage of PCT/JP2016/075147 filed Aug. 29, 2016, which claims priority of Japanese Patent Application No. JP 2016-132344 filed Jul. 4, 2016 and Japanese Patent Application No. JP 2015-172818 filed Sep. 2, 2015.

TECHNICAL FIELD

The present invention relates to a DC-DC converter.

BACKGROUND

In a DC-DC converter that drives switching elements to step up or step down a voltage, if an excessive current flows through a power supply line due to a short circuit fault occurring in one of the switching elements, it is necessary to immediately detect an overcurrent state so that devices can be protected. For example, according to the technology disclosed in JP 2009-5555A, in a step-down DC-DC converter that is provided with a plurality of voltage step-down units, a current value is taken in from the high-voltage side and the low-voltage side of a switching element in each voltage step-down unit. Then, whether or not a failure has occurred is monitored by continuously determining whether or not a difference among the current values is greater than a predetermined value. Upon a failure being detected, the output is limited in order to prevent a non-faulty voltage step-down unit from being overloaded.

However, if a short circuit fault occurs in a switching element of a voltage step-down unit itself, it is not possible to prevent a short circuit state by simply using the method according to JP 2009-5555A, and a large current flows from the high-voltage side to the low-voltage side, which leads to an excessive voltage being unexpectedly applied to the low-voltage side. To solve this problem, it is necessary to additionally provide a configuration that can immediately block a short circuit path upon a short circuit fault occurring in a switching element of a voltage step-down unit itself. Furthermore, it is necessary to protect a circuit not only when a short circuit faulty occurs, but also when a power supply is connected the wrong way round, and there is demand for a configuration that can realize both short circuit protection and reverse connection protection.

An example of a DC-DC converter that can realize both short circuit protection and reverse connection protection is shown in FIG. 11. A DC-DC converter 100 in FIG. 11 is an example of a step-down DC-DC converter, and is configured to step down a DC voltage applied to an input line 102A on the primary side, by switching a MOSFET 104 on the high side and a MOSFET 106 on the low side, and to output the resulting voltage to an output line 102B on the secondary side. The DC-DC converter 100 monitors a current flowing through a power supply conductive path 102, using a current detection unit (not shown). For example, if an excessive current is generated in the power supply conductive path 102 due to a short circuit occurring in the MOSFET 104, the DC-DC converter 100 detects an overcurrent state and performs control to block switching elements 108 for protection. The switching elements 108 also serve as elements for reverse connection protection. For example, if a terminal 112 has a negative potential due to reverse connection in which the positive electrode and the negative electrode of the secondary-side power supply unit are connected the wrong way round, and a large current flows to the secondary side due to this reverse connection, control may be performed to block the switching elements 108 for protection, upon the occurrence of the large current being detected.

However, in the step-down DC-DC converter 100 shown in FIG. 11, a current flowing through the output line 102B on the secondary side (the low-voltage side) is larger than a current flowing through the input line 102A on the primary side (the high-voltage side). Therefore, as in the configuration shown in FIG. 11, if the switching elements 108 for protection are provided on paths on the secondary side (the low-voltage side) through which a large current flows, conduction loss in the switching elements 108 increases, and the amount of heat generated due to the conduction loss also increases.

The present invention has been made in view of the above-described situation, and aims to realize a DC-DC converter that is provided with a protection function for handling a reverse connection state, and a protection function for handling a predetermined abnormality other than a reverse connection state, while reducing conduction loss.

SUMMARY

A DC-DC converter according to the present invention includes a voltage conversion unit that includes a first switching element, is provided between a first conductive path that is electrically connected to a high-potential side terminal of a primary-side power supply unit and a second conductive path that is electrically connected to a high-potential side terminal of a secondary-side power supply unit, converts a voltage applied to the first conductive path by switching the first switching element between an ON state and an OFF state, and outputs the resulting voltage to the second conductive path. The A DC-DC converter further includes an abnormal state detection unit that detects a predetermined abnormal state; a first protection circuit that includes a second switching element unit that is provided on a high-voltage side conductive path, out of the first conductive path and the second conductive path, and switches between an OFF state, in which the second switching element blocks at least a current flowing in a direction toward the voltage conversion unit, and an ON state, in which the second switching element releases the blocking, the first protection circuit unit switching the second switching element to an OFF state upon the abnormal state detection unit detecting the abnormal state; and a second protection circuit unit that includes a third switching element that is provided on a third conductive path that is located between the voltage conversion unit and a reference conductive path that is maintained at a predetermined reference potential that is lower than the potential of the first conductive path and the potential of the second conductive path, and switches between an OFF state, in which the third switching element blocks at least a current flowing from the reference conductive path, and an ON state, in which the third switching element releases the blocking, the second protection circuit unit switching the third switching element to an ON state if a terminal of at least a low-voltage side power supply unit, out of the primary-side power supply unit and the secondary-side power supply unit, is in a regular connection state, and switching the third switching element to an OFF state if the terminal of at least the low-voltage side power supply unit is in a reverse connection state.

Advantageous Effects of Invention

According to the present invention, the second switching element included in the first protection circuit unit is provided on the high-voltage side conductive path out of the first conductive path and the second conductive path. The first protection circuit unit is configured such that, upon a predetermined abnormal state occurring, the second switching element switches to an OFF state to prevent a current from flowing into the voltage conversion unit via the high-voltage side conductive path. With this configuration, when an abnormal state occurs, it is possible to protect a circuit by blocking the high-voltage side conductive path. In addition, since the second switching element for performing such blocking is provided on the high-voltage side (the high-voltage side conductive path) where the amount of a current flow is relatively small, out of the first conductive path and the second conductive path, the second switching element can realize short circuit protection while reducing conduction loss and the amount of heat generation.

Furthermore, the third switching element included in the second protection circuit unit is provided on the conductive path (the third conductive path) between the voltage conversion unit and the reference conductive path. The third switching element is configured to enter an ON state if a terminal of at least a low-voltage side power supply unit, out of the primary-side power supply unit and the secondary-side power supply unit, is in a regular connection state, and switches to an OFF state if the terminal is in a reverse connection state. With this configuration, when the low-voltage side power supply unit is in a reverse connection state, it is possible to block a current flowing from the reference conductive path through the third conductive path located between the voltage conversion unit and the reference conductive path, and it is possible to prevent a current from the reference conductive path from flowing into the power supply that is connected the wrong way round. In addition, the third conductive path, on which the third switching element is provided, is a path where the amount of a current flow is smaller than that in the low-voltage side (the low-voltage side conductive path) out of the first conductive path and the second conductive path, and therefore it is possible to reduce conduction loss and the amount of heat generation compared to a configuration in which a similar switching element is located on the low-voltage side conductive path to achieve reverse connection protection.

As described above, the present invention can realize a DC-DC converter that is provided with a protection function for handling a reverse connection state, and a protection function for handling a predetermined abnormality other than a reverse connection state, while further reducing conduction loss.

DETAILED DESCRIPTION OF PREFERRED EMBODIMENTS

Figure 1:
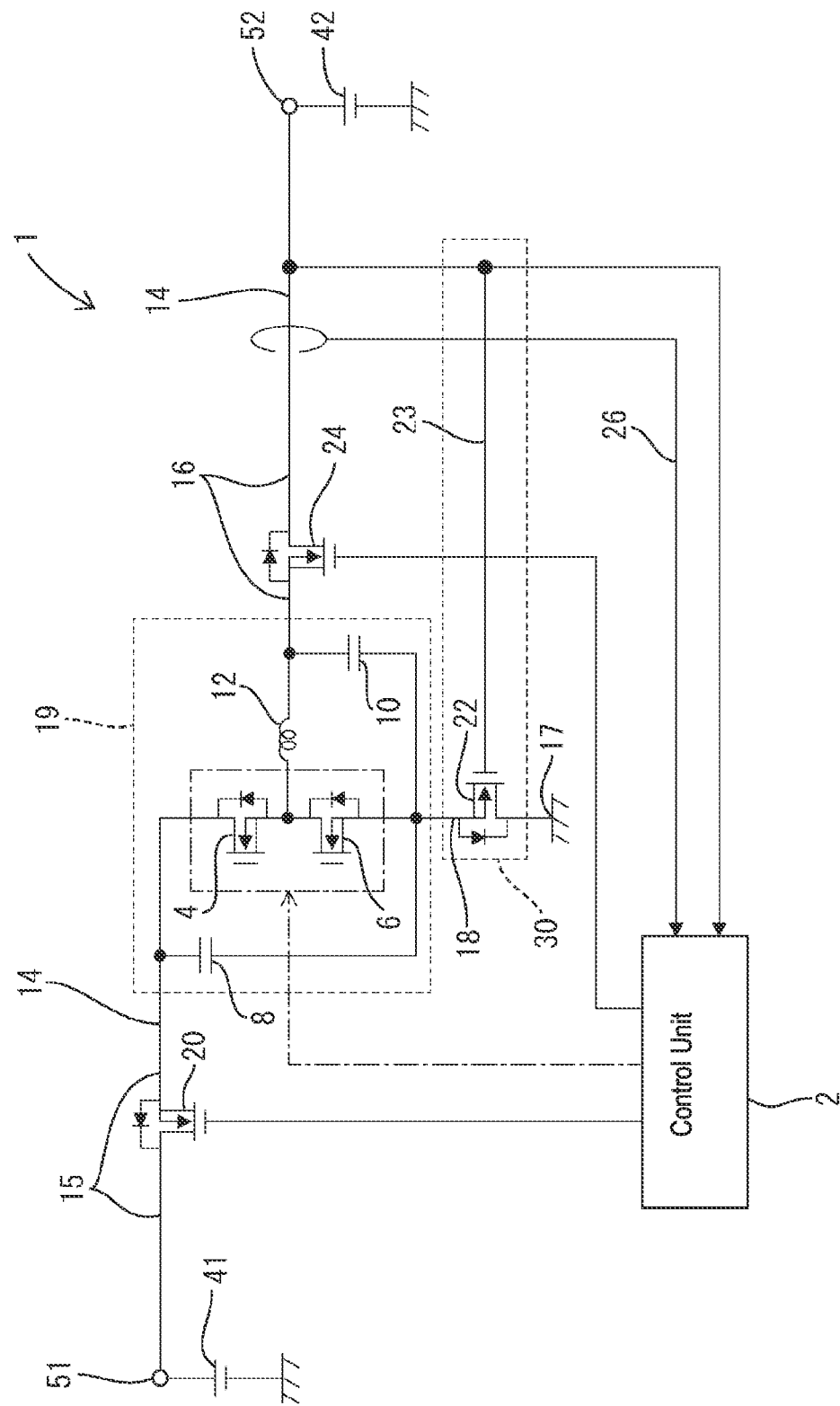
FIG. 1 is a circuit diagram schematically illustrating a DC-DC converter according to a first embodiment.

The following shows preferred examples of the present invention.

The abnormal state detection unit may function to detect, as the abnormal state, a predetermined overcurrent state of a current flowing through at least one of the first conductive path and the second conductive path. The first protection circuit unit may function to switch the second switching element to an OFF state upon the abnormal state detection unit detecting that at least one of the first conductive path and the second conductive path is in the overcurrent state.

With this configuration, upon an excessive current being generated, it is possible to switch the second switching element to an OFF state to prevent a current from flowing into the voltage conversion unit via the high-voltage side conductive path. Therefore, it is possible to realize a configuration that can handle overcurrent that may cause a failure in an apparatus, while reducing conduction loss.

The secondary-side power supply unit may be configured as the low-voltage side power supply unit, the primary-side power supply unit may be configured as a high-voltage side power supply unit, and the voltage conversion unit may be configured to step down a DC voltage applied to the first conductive path and output the resulting voltage to the second conductive path. In this configuration, the abnormal state detection unit may function to detect, as the abnormal state, a predetermined overvoltage state of at least the first conductive path, and the first protection circuit unit may function to switch the second switching element to an OFF state upon the abnormal state detection unit detecting an overvoltage state of the first conductive path.

In such a configuration, an excessive voltage is applied to the high-voltage side conductive path (the first conductive path) on the input side. If such a state continues, there is concern that the risk of a failure occurring in the DC-DC converter increases. In this regard, with the above-described configuration, the second switching element is brought into an OFF state upon an overvoltage state of the first conductive path being detected. Thus, it is possible to prevent a current from flowing into the voltage conversion unit via the high-voltage side conductive path. Therefore, it is possible to prevent an internal failure from occurring due to an excessive voltage on the first conductive path. In addition, as a result of such a countermeasure being taken, it is possible to lower the withstand voltage of components that are located downstream of the second switching element.

In a configuration in which the secondary-side power supply unit is configured as the low-voltage side power supply unit, the primary-side power supply unit is configured as a high-voltage side power supply unit, and the voltage conversion unit is configured to step down a DC voltage applied to the first conductive path and output the resulting voltage to the second conductive path, the abnormal state detection unit may function to detect, as the abnormal state, a predetermined overvoltage state of at least the first conductive path, and the first protection circuit unit may switch the second switching element to an OFF state upon the abnormal state detection unit detecting an overvoltage state of the first conductive path.

With this configuration, if overvoltage occurs in a low-voltage side (output side) conductive path (the second conductive path), it is possible to switch the second switching element to an OFF state. Due to such operations, it is possible to prevent the output from continuing despite the overvoltage state, and it is possible to prevent an electrical device connected to the second conductive path from breaking down due to overvoltage in the second conductive path.

The abnormal state detection unit may function to detect, as the abnormal state, a predetermined overcurrent state of a current flowing through the third conductive path, and the first protection circuit unit may function to switch the second switching element to an OFF state upon the abnormal state detection unit detecting an overcurrent state of the third conductive path.

With this configuration, when an excessive current flows into the voltage conversion unit due to an internal failure or the like, it is possible to switch the second switching element to an OFF state, and it is possible to prevent a failure such as abnormal heat generation from occurring due to an excessive current flowing from the primary-side power supply unit to the inside.

The present invention may further comprise a fourth switching element that is located on a low-voltage side conductive path out of the first conductive path and the second conductive path, and switches between an OFF state, in which the fourth switching element blocks at least a current flowing in a direction toward the voltage conversion unit, and an ON state, in which the fourth switching element releases the blocking. The abnormal state detection unit may detect, as the abnormal state, at least one of a predetermined overcurrent state and a predetermined overvoltage state of at least one of the first conductive path, the second conductive path, and the third conductive path. The first protection circuit unit may switch the second switching element and the fourth switching element to an OFF state upon the abnormal state detection unit detecting an overcurrent state or an overvoltage state of at least one of the first conductive path, the second conductive path, and the third conductive path.

With this configuration, it is possible to switch both the second switching element and the fourth switching element to an OFF state upon at least one of an overcurrent state or an overvoltage state occurring in at least one of the first conductive path, the second conductive path, and the third conductive path. Thus, it is possible to prevent a current from the primary-side power supply unit from flowing into the voltage conversion unit, and to prevent a current from the secondary-side power supply unit from flowing into the voltage conversion unit. Such a configuration realizes more reliable protection.

In a configuration in which the secondary-side power supply unit is configured as the low-voltage side power supply unit, the primary-side power supply unit is configured as the high-voltage side power supply unit, and the voltage conversion unit is configured to step down a DC voltage applied to the first conductive path and output the resulting voltage to the second conductive path, the second switching element of the first protection circuit unit may be provided on the first conductive path. In this configuration, the DC-DC converter may further include a third protection circuit unit that includes a fourth switching element that is provided on the second conductive path and switches between an OFF state, in which the fourth switching element blocks a current flowing in a reverse direction toward the voltage conversion unit, and an ON state, in which the fourth switching element releases the blocking, the third protection circuit unit switching the fourth switching element to an OFF state upon the second conductive path entering a reverse flow state.

This configuration realizes a step-down DC-DC converter that is protected against an abnormal state by the first protection circuit unit and is protected against a reverse connection state by the second protection circuit unit, and furthermore, the third protection circuit unit can prevent a current from flowing in a reverse direction on the secondary-side (the low-voltage side). In addition, in this configuration, the second switching element is located on the primary-side conductive path (the first conductive path), the fourth switching element is located on the secondary-side conductive path (the second conductive path), and the third switching element is located on the third conductive path that is close to the reference conductive path. That is, the switching elements, which generate heat, can be dispersed, so that a local temperature rise can be further suppressed.

Figure 11:
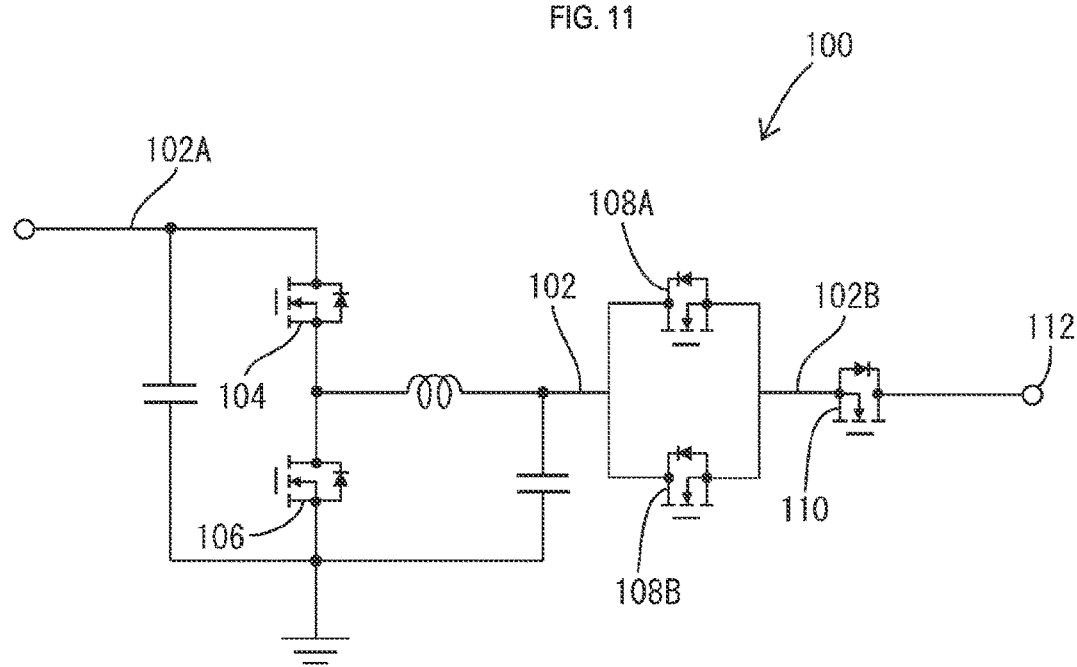
FIG. 11 is a circuit diagram schematically illustrating a DC-DC converter according to a comparative example.

For example, in the configuration of the comparative example shown in FIG. 11, it is possible to prevent a current from flowing in a reverse direction on the secondary-side, by switching the switching element 110 for reverse flow protection to an OFF state upon a reverse flow occurring. However, with such a configuration, switching elements that cause significant conduction loss are concentrated on the low-potential side (the side on which a large current flows). That is, with the configuration shown in FIG. 11, there is the risk of a local temperature rise in an area on the low-potential side of the power supply conductive path. In contrast, with the above-described configuration in which the second, third, and fourth switching elements are dispersed, it is possible to reduce such a temperature rise.

The abnormal state detection unit may function to detect, as the abnormal state, a predetermined overcurrent state of a current flowing through the third conductive path, and the first protection circuit unit and the third protection circuit unit may function to switch the second switching element and the fourth switching element to an OFF state upon the abnormal state detection unit detecting an overcurrent state of the third conductive path.

With this configuration, when an excessive current flows into the voltage conversion unit due to an internal failure or the like, it is possible to switch both the second switching element and the fourth switching element to an OFF state. Thus, it is possible to prevent a current from the primary-side power supply unit from flowing into the voltage conversion unit, and to prevent a current from the secondary-side power supply unit from flowing into the voltage conversion unit. In this way, it is possible to block currents from both power supply units to prevent overcurrents in the voltage conversion unit, and it is possible to more effectively prevent a failure such as abnormal heat generation from occurring.

The present invention may be configured to detect a current flowing through the third switching element, and to switch the second switching element to an OFF state if a current flowing through the third switching element is in a predetermined overcurrent state. Also, in a configuration provided with the fourth switching element, the present invention may be configured to detect a current flowing through the third switching element, and to switch one of or both the second switching element and the fourth switching element to an OFF state if a current flowing through the third switching element is in a predetermined overcurrent state. With such a configuration, it is possible to determine whether or not an excessive current has occurred in the path between the voltage conversion unit and the reference conductive path by using the third switching element as an element for current detection as well. In particular, some or all of dedicated elements for current detection may be omitted. Therefore, it is possible to reduce an increase in the number of parts and an increase in loss caused by the dedicated elements.

In the present invention, a capacitor such as a ceramic capacitor may be provided whose one electrode is connected to the conductive path between the second switching element and the voltage conversion unit, and whose other electrode is connected to the conductive path between the third switching element and the voltage conversion unit. If a capacitor is arranged in this way, it is possible to realize a configuration that can achieve the effects that are produced by the capacitor, while making it possible to address a short circuit fault occurred in the capacitor. For example, if the present invention is configured such that whether or not an excessive current has occurred in the path between the voltage conversion unit and the reference conductive path is determined, and the second switching element is blocked if an overcurrent state has occurred, it is possible to switch the path between the primary-side power supply unit and the capacitor to a non-conductive state when a short circuit fault has occurred in the capacitor, and it is possible to block an excessive current flowing from the primary-side power supply unit to the reference conductive path via the capacitor when a short circuit fault has occurred in the capacitor.

In the present invention, a plurality of voltage conversion units that step down a DC voltage applied to the first conductive path and output the resulting voltage to the second conductive path may be provided in parallel between the first conductive path and the second conductive path. The first conductive path may include a shared input path that is electrically connected to a high-potential side terminal of the primary-side power supply unit, and a plurality of individual input paths that branch off from the shared input path and are respectively connected to the voltage conversion units, and the second conductive path may include a plurality of individual output paths that are respectively connected to the plurality of voltage conversion units, and a shared output path to which the plurality of individual output paths are commonly connected and that is electrically connected to a high-potential side terminal of the secondary-side power supply unit. The first protection circuit unit may include a plurality of second switching elements that are respectively provided on the individual input paths, and the individual input paths may be individually switchable to an OFF state and an ON state.

With this configuration, it is possible to realize a multi-phase DC-DC converter that is provided with the function of protecting a circuit from a predetermined abnormal state and the function of protecting a circuit from a reverse connection state, while further reducing conduction loss. In addition, since the first protection circuit unit allows the individual input paths to individually switch to an OFF state and an ON state, it is not necessary to invariably stop the operations of all of the voltage conversion units when a predetermined abnormal state has occurred, and in some cases, it is possible to take a flexible countermeasure, e.g. to selectively stop the operations of some voltage conversion units.

In the present invention, a plurality of voltage conversion units that step down a DC voltage applied to the first conductive path and output the resulting voltage to the second conductive path may be provided in parallel between the first conductive path and the second conductive path. The first conductive path may include a shared input path that is electrically connected to a high-potential side terminal of the primary-side power supply unit, and a plurality of individual input paths that branch off from the shared input path and are respectively connected to the voltage conversion units. The second conductive path may include a plurality of individual output paths that are respectively connected to the plurality of voltage conversion units, and a shared output path to which the plurality of individual output paths are commonly connected and that is electrically connected to a high-potential side terminal of the secondary-side power supply unit. The first protection circuit unit may include a plurality of second switching elements that are respectively provided on the individual input paths, and the individual input paths may be individually switchable to an OFF state and an ON state. The third protection circuit unit may include a plurality of fourth switching elements that are respectively provided on the individual output paths, and the individual output paths may be individually switchable to an OFF state and an ON state. The abnormal state detection unit may have the function of detecting an abnormal voltage conversion unit that causes the abnormal state, from among the plurality of voltage conversion units. Upon the abnormal state detection unit detecting the abnormal voltage conversion unit, the first protection circuit unit and the third protection circuit unit may function to selectively switch the second switching elements and the fourth switching elements provided on the path of the abnormal voltage conversion unit, out of the plurality of second switching elements and the plurality of fourth switching elements, to an OFF state.

With this configuration, it is possible to realize a multi-phase DC-DC converter that is provided with the function of protecting a circuit from a predetermined abnormal state and the function of protecting a circuit from a reverse connection state, while further reducing conduction loss. In addition, it is possible to detect a voltage conversion unit that causes an abnormal state (an abnormal voltage conversion unit) from among the plurality of voltage conversion units. If an abnormal voltage conversion unit is detected, the second switching elements and the fourth switching elements provided on the path of the abnormal voltage conversion unit can be selectively brought into an OFF state, and thus the input and the output of the corresponding phase can be reliably stopped so that protection can be realized. On the other hand, it is possible to operate voltage conversion units that are not in an abnormal state, and therefore it is possible to continue the output to the second conductive path. Furthermore, since it is possible to block a current flowing into the conversion unit that causes an abnormal state not only in the input-side conductive path (the individual input path) but also in the output-side conductive path (the individual output path), when a voltage conversion unit that does not cause an abnormal state is operated, the output current from the voltage conversion unit can be prevented from flowing from the individual output path of the voltage conversion unit that is to be stopped from operating (an abnormal voltage conversion unit) into the inside.

In the present invention, an operation control unit may be further provided that sequentially operates the plurality of voltage conversion units. The present invention may be configured such that, if the abnormal state detection unit detects the abnormal state while one of the plurality of voltage conversion units is operating, and the abnormal state detection unit does not detect the abnormal state while another one of the plurality of voltage conversion units is operating, the first protection circuit unit selectively switches the second switching element on the individual input path that is an input path to the one of the plurality of voltage conversion units from which the abnormal state is detected, into an OFF state, and maintains the second switching element on the individual input path that is an input path to the other voltage conversion unit from which an abnormal state is not detected, in an ON state.

With this configuration, in a multiphase DC-DC converter, it is possible to more accurately and more efficiently detect a voltage conversion path in which an abnormal state has occurred, from among a plurality of voltage conversion paths. Then, it is possible to selectively stop only the operations of those voltage conversion paths in which an abnormal state has occurred. In particular, since it is possible to continue the operations of a normal voltage conversion path in which an abnormal state has not occurred, the configuration is advantageous in cases where it is desired that the operations are continued with respect to at least some of the phases.

Note that, in the present invention, a reverse connection protection circuit may be configured such that the third switching element is brought into an OFF state when a terminal of the high-voltage side power supply unit, out of the primary-side power supply unit and the secondary-side power supply unit, is in a reverse connection state. With such a configuration, it is possible to address not only reverse connection of the low-voltage side power supply unit, but also reverse connection of the high-voltage side power supply unit. Therefore, it is possible to realize a configuration that can achieve protection when either power supply is connected in the wrong way round, while reducing an increase in the number of elements and conduction loss.

First Embodiment

The following describes a first embodiment, which is a specific example of the present invention.

A DC-DC converter 1 shown in FIG. 1 is configured as an on-board step-down DC-DC converter, for example, and is configured to step down a DC voltage applied to a conductive path on the input side (a first conductive path 15), and output the resulting voltage to a conductive path on the output side (a second conductive path 16).

The DC-DC converter 1 is provided with a power supply conductive path 14 that includes the first conductive path 15 and the second conductive path 16 and that serve as a power supply line, and a reference conductive path 17 that is maintained at a constant reference potential (a ground potential) that is lower than the potential of the power supply conductive path 14. A voltage conversion unit 19 that generates an output voltage to be applied to the second conductive path 16 by stepping down an input voltage applied to the first conductive path 15 is provided between the first conductive path 15 and the second conductive path 16.

The first conductive path 15 is configured as a primary side (high-voltage side) power supply line to which a relatively high voltage is applied. The first conductive path 15 is electrically connected to a high-potential side terminal of a primary-side power supply unit 41, and a predetermined DC voltage from the primary-side power supply unit 41 is applied to the first conductive path 15.

The primary-side power supply unit 41 is constituted by a power storage means such as a lithium ion battery or an electrical double-layer capacitor, and generates a first predetermined voltage. For example, the high-potential side terminal of the primary-side power supply unit 41 is maintained at 48 V, and the low-potential side terminal of the same is maintained at the ground potential (0 V). Note that, in the example shown in FIG. 1, a state in which a terminal 51 of the first conductive path 15 is connected to the positive terminal of the primary-side power supply unit 41 is a regular connection state of the primary-side power supply unit 41.

The second conductive path 16 is configured as a secondary side (low-voltage side) power supply line to which a relatively low voltage is applied. The second conductive path 16 is electrically connected to a high-potential side terminal of a secondary-side power supply unit 42, for example, and a DC voltage from the secondary-side power supply unit 42, which is lower than the output voltage from the primary-side power supply unit 41, is applied to the second conductive path 16.

The secondary-side power supply unit 42 is constituted by a storage unit such as a lead-acid battery, and generates a second predetermined voltage that is lower than the first predetermined voltage that is generated by the primary-side power supply unit 41. For example, the high-potential side terminal of the secondary-side power supply unit 42 is maintained at 12 V, and the low-potential side terminal of the same is maintained at the ground potential (0 V). Note that, in the example shown in FIG. 1, a state in which a terminal 52 of the second conductive path 16 is connected to the positive terminal of the secondary-side power supply unit 42 is a regular connection state of the secondary-side power supply unit 42.

The reference conductive path 17 is configured as a ground, and is maintained at a constant ground potential (0 V). The low-potential side terminal of the primary-side power supply unit 41 and the low-potential side terminal of the secondary-side power supply unit 42 are electrically connected to the reference conductive path 17, and the drain of a switching element 22 described below is also connected to the reference conductive path 17.

The voltage conversion unit 19 is provided between the first conductive path 15 and the second conductive path 16, and includes a high-side switching element 4 that is configured as a MOSFET, and a low-side switching element 6 that is also configured as a MOSFET. The voltage conversion unit 19 also includes an input-side capacitor 8, an output-side capacitor 10, and a coil 12. The high-side switching element 4 is a switching element that turns on and off the input DC voltage from the first conductive path 15, and is equivalent to the first switching element.

In the voltage conversion unit 19, the first conductive path 15, which is a portion of the power supply conductive path 14, is connected to the drain of the high-side switching element 4. The drain of the switching element 4 is electrically connected to the electrode of the input-side capacitor 8 on one side, and when a switching element 20, which is inserted into the first conductive path 15, is in an ON state, the drain is also connected to the high-potential side terminal of the primary-side power supply unit 41. Also, the drain of the low-side switching element 6 and one end of the coil 12 are connected to the source of the switching element 4. A driving signal and a non-driving signal from a control unit 2 are input to the gate of the switching element 4, and the switching element 4 switches between an ON state and an OFF state in response to a signal from the control unit 2.

The respective electrodes of the input-side capacitor 8 and the output-side capacitor 10 on the other side are connected to the source of the low-side switching element 6. The source of the switching element 6 and the respective electrodes of the input-side capacitor 8 and the output-side capacitor 10 on the other side are electrically connected to each other, and they are connected to the source of switching element 22 via a third conductive path 18. A driving signal and a non-driving signal from the control unit 2 are also input to the gate of the low-side switching element 6, and the switching element 6 switches between an ON state and an OFF state in response to a signal from the control unit 2.

In the voltage conversion unit 19, the other end of the coil 12 is connected to the second conductive path 16, which is an output-side power supply line, and the other end of the coil 12 is electrically connected to one electrode of the output-side capacitor 10 and the source of a switching element 24.

The voltage conversion unit 19 with such a configuration serves as a synchronous rectification type step-down converter, and switches the low-side switching element 6 to ON and OFF in synchronization with the operation of the high-side switching element 4, thereby stepping down the DC voltage applied to the first conductive path 15 and outputting the resulting voltage to the second conductive path 16. Specifically, under the control of the control unit 2, the voltage conversion unit 19 alternately switches to a first state, in which the switching element 4 is in an ON state and the switching element 6 is in an OFF state, and to a second state, in which the switching element 4 is in an OFF state and the switching element 6 is in an ON state. By repeating such a switching between the first state and the second state, the voltage conversion unit 19 steps down the DC voltage applied to the first conductive path 15, and outputs the resulting voltage to the second conductive path 16. Note that the output voltage from the second conductive path 16 is determined according to the duty ratio of a PWM signal that is given to the gate of the switching element 4.

The configuration above is the basic configuration of the DC-DC converter 1, and the DC-DC converter 1 performs a step-down operation according to well-known technology. Upon an abnormality occurring in the DC-DC converter 1, an element corresponding to the type of the abnormality, from among the switching element 20, the switching element 22, and the switching element 24, is switched to an OFF state so that the DC-DC converter 1 can be protected.

The following describes the function of protecting a circuit from an overcurrent state and an overvoltage state that occur in the power supply conductive path 14 due to a short circuit, for example. Note that an overcurrent state and an overvoltage state that occur in the power supply conductive path 14 are examples of the predetermined abnormal state.

The DC-DC converter 1A is provided with a current detection path 26 for detecting a current flowing through the second conductive path 16. The current detection path 26 is a path for detecting a current flowing through the second conductive path 16, using a well-known method. The control unit 2 knows the value of a current flowing through the second conductive path 16 based on a value that is input via the current detection path 26. Although the current detection path 26 in FIG. 1 is shown only schematically, various well-known current detection circuits may be specifically employed as a current detection circuit on the current detection path 26, and any configuration may be employed, provided that the control unit 2 is enabled to know the value Io of a current flowing through the second conductive path 16.

The control unit 2 serves as an abnormal state detection unit, and determines whether or not an excessive current has occurred in the second conductive path 16 to determine whether or not an abnormality has occurred. Specifically, the control unit 2 compares the detected current value Io of the second conductive path 16 with a predetermined threshold value It. If Io≤It is satisfied, the control unit 2 determines that the power supply conductive path 14 is not in an overcurrent state, and if Io>It is satisfied, the control unit 2 determines that the power supply conductive path 14 is in an overcurrent state. Thus, the control unit 2 detects an abnormal state of the power supply conductive path 14.

The voltage across the second conductive path 16 is input to the control unit 2, and the control unit 2 also determines whether or not overvoltage has occurred in the second conductive path 16 to determine whether or not an abnormal state has occurred in the power supply conductive path 14. Specifically, the control unit 2 compares the detected voltage value Vo of the second conductive path 16 with a predetermined threshold value Vt. If Vo≤Vt is satisfied, the control unit 2 determines that the power supply conductive path 14 is not in an overvoltage state, and if Vo>Vt is satisfied, the control unit 2 determines that the power supply conductive path 14 is in an overvoltage state. Thus, the control unit 2 detects an abnormal state of the power supply conductive path 14.

On the other hand, the first conductive path 15 is provided with the switching element 20, which is configured as a MOSFET. The switching element 20 is an example of the second switching element, and switches to an ON state and an OFF state by being controlled by the control unit 2. For example, if overcurrent or overvoltage occurs in the power supply conductive path 14 due to a short circuit, the switching element 20 can function to protect a circuit from such an abnormality, and can serve as a switch for short circuit protection.

Specifically, while the control unit 2 is detecting that the current value Io of the second conductive path 16 is smaller than or equal to the threshold value It, and that the voltage value Vo of the second conductive path 16 is smaller than or equal to the threshold value Vt, an ON signal is continuously output from the control unit 2 to the gate of the switching element 20. In this way, while an ON signal is continuously input to the gate of the switching element 20 and the switching element 20 is maintained in an ON state (i.e. the period during which conduction is unblocked), a path between the primary-side power supply unit 41 and the voltage conversion unit 19 is in a conductive state, and a DC voltage that is generated in the primary-side power supply unit 41 is continuously input to the voltage conversion unit 19.

On the other hand, if the control unit 2 detects that the current value Io of the second conductive path 16 is greater than the threshold value It, or the voltage value Vo of the second conductive path 16 is greater than the threshold value Vt, an OFF signal is output from the control unit 2 to the gate of the switching element 20. If an OFF signal is input to the gate of the switching element 20 in this way and the switching element 20 switches to an OFF state, the primary-side power supply unit 41 and the voltage conversion unit 19 on the first conductive path 15 are electrically disconnected from each other. If this is the case, the DC voltage generated in the primary-side power supply unit 41 is not input to the voltage conversion unit 19. Note that the control unit 2 and the switching element 20 constitute an example of the first protection circuit unit.

In this way, in the configuration shown in FIG. 1, the switching element 20 switches to an OFF state upon the power supply conductive path 14 entering an overcurrent state or an overvoltage state due to a short circuit, for example. Therefore, the switching element 20 can protect a circuit by blocking a current flowing through the power supply conductive path 14. In addition, since the switching element 20 is provided on the high-voltage side conductive path (the first conductive path 15) where the amount of a current flow is relatively small in the power supply conductive path 14, the switching element 20 can protect a circuit from overcurrent or overvoltage while reducing conduction loss and the amount of heat generation.

Specifically, it is possible to prevent a current from flowing into the voltage conversion unit 19 via the high-voltage side conductive path (the first conductive path 15) by switching the switching element 20 to an OFF state upon overcurrent occurring in the power supply conductive path 14. Therefore, it is possible to realize a configuration that can handle overcurrent that may cause a failure in an apparatus, while reducing conduction loss. Also, if overvoltage occurs in a low-voltage side (output side) conductive path (the second conductive path 16), it is possible to switch the switching element 20 to an OFF state. Due to such operations, it is possible to prevent the output from continuing despite the overvoltage state, and it is possible to prevent an electrical device connected to the second conductive path 16 from breaking down due to overvoltage in the second conductive path 16.

Next, a configuration that is relevant to reverse connection protection will be described.

The DC-DC converter 1 in FIG. 1 includes a reverse connection protection circuit unit 30, which is an example of the second protection circuit unit. The DC-DC converter 1 is configured to block conduction through the third conductive path 18 when the secondary-side power supply unit 42 is connected the wrong way round, to prevent a current from flowing to the secondary side in the event of reverse connection. The reverse connection protection circuit unit 30 includes the switching element 22, which is located in the conductive path (the third conductive path 18) between the voltage conversion unit 19 and the reference conductive path 17 and serves as a switching element for reverse connection protection, and a fourth conductive path 23 that maintains the gate potential of the switching element 22 at the potential of the second conductive path 16. The switching element 22 is an example of the third switching element, and is configured to switch to an OFF state, in which the switching element 22 blocks conduction through the third conductive path 18 (specifically, a current flowing in the direction from the reference conductive path 17 to the voltage conversion unit 19), and to an ON state, in which the switching element 22 releases the blocking.

In the reverse connection protection circuit unit 30, the switching element 22 is switched to an ON state, provided that the terminals of at least the secondary-side power supply unit 42 (the low-voltage side power supply unit) are in a regular connection state as shown in FIG. 1. In this case, the gate potential of the switching element 22 is substantially equal to the potential of the positive electrode of the secondary-side power supply unit 42 (e.g. 12 V), and the gate potential is maintained to be higher than the source potential. Thus, the switching element 22 is maintained in an ON state. Then, the source of the low-side switching element 6, the input-side capacitor 8, and the output-side capacitor 10 are maintained in a conductive state in which they are electrically connected to the reference conductive path 17.

In contrast, when the terminals of the secondary-side power supply unit 42 (the low-voltage side power supply unit) are in a reverse connection state in which the positive and the negative terminals are connected the wrong way round, the gate potential of the switching element 22 is substantially the same as the potential of the negative electrode of the secondary-side power supply unit 42 (e.g. −12 V), and the gate potential is maintained to be lower than the source potential. Therefore, the switching element 22 is maintained in an OFF state. When the switching element 22 is in an OFF state (a state in which a current flowing in the direction from the reference conductive path 17 to the voltage conversion unit 19 is blocked), the source of the switching element 6, the input-side capacitor 8, and the output-side capacitor 10 are not electrically connected to the reference conductive path 17. Also, in the configuration shown in FIG. 1, even when the path between the secondary-side power supply unit 42 and the second conductive path 16 is in an open state, the switching element 22 is maintained in an OFF state.

As described above, in the reverse connection protection circuit unit 30, the switching element 22 is automatically switched to an OFF state upon the secondary-side power supply unit 42 (the low-voltage side power supply unit) entering a reverse connection state, so that a current flowing through the third conductive path 18 can be blocked. Consequently, it is possible to prevent a current from the reference conductive path 17 from flowing into the power supply that is connected the wrong way round. Also, the switching element 22 inserted into the third conductive path 18 is configured to be turned OFF when the primary-side power supply unit 41 is connected the wrong way round, and therefore it is possible to handle a situation in which the primary-side power supply unit 41 is connected the wrong way round. In addition, the third conductive path 18, on which the switching element 22 is provided, is a path where the amount of current is smaller than that in the low-voltage side of the power supply conductive path 14 (the second conductive path 16), and therefore it is possible to reduce conduction loss and the amount of heat generation compared to a configuration in which a similar switching element is located on the second conductive path 16 to achieve reverse connection protection.

Next, a configuration that is relevant to reverse flow protection will be described.

The control unit 2 provided in the DC-DC converter 1 in FIG. 1 knows the value of a current flowing through the second conductive path 16 based on a value that is input via the above-described current detection path 26. The control unit 2 detects not only the value of a current flowing through the second conductive path 16, but also the direction in which a current flows. The control unit 2 determines whether the direction in which a current flows through the second conductive path 16 is a first direction, which is the direction from the voltage conversion unit 19 to the secondary-side power supply unit 42 (i.e. the direction from the source to the drain, of the switching element 24), or a second direction, which is the direction from the secondary-side power supply unit 42 to the voltage conversion unit 19 (i.e. the direction from the drain to the source, of the switching element 24).

The second conductive path 16 is provided with the switching element 24, which can serve as a switching element for reverse flow protection. The switching element 24 is an example of the fourth switching element, and is configured to switch to an OFF state, in which the switching element 24 blocks conduction through the second conductive path 16, and to an ON state, in which the switching element 24 releases the blocking.

The control unit 2 continuously outputs an ON signal to the gate of the switching element 24 while detecting that the direction of a current flowing through the second conductive path 16 is "the first direction" above (i.e. while detecting that the direction of a current flow is in a normal state). That is, when the direction of a current flowing through the second conductive path 16 is normal, the switching element 24 is constantly in an ON state, and the portion of the second conductive path 16 between the voltage conversion unit 19 and the secondary-side power supply unit 42 is in a conductive state (a state in which a current is allowed to flow in the reverse direction, toward the voltage conversion unit 19). In contrast, the control unit 2 outputs an OFF signal to the gate of the switching element 24 upon detecting that the direction of a current flowing through the second conductive path 16 is "the second direction" above (i.e. upon detecting that the direction of a current flow is in a reverse flow state). Thus, the switching element 24 is switched to an OFF state upon the direction of a current flowing through the second conductive path 16 changing to the reverse direction. Consequently, the portion of the second conductive path 16 between the voltage conversion unit 19 and the secondary-side power supply unit 42 is brought into a predetermined blocked state (a state in which a current flowing in the reverse direction toward the voltage conversion unit 19 is blocked), and thus a current flowing through the portion between them in the reverse direction toward the voltage conversion unit 19 is blocked. Note that the control unit 2 and the switching element 24 constitute an example of the third protection circuit unit.

With this configuration, it is not only possible to protect a circuit from an overcurrent state and an overvoltage state that occur in the power supply conductive path 14 due to a short circuit, for example, but also possible to prevent a current from flowing in the reverse direction on the secondary side (the low voltage side). In addition, in this configuration, the switching element 20 that can protect a circuit from an overcurrent state and an overvoltage state that occur in the power supply conductive path 14 is located on the primary-side power supply conductive path (the first conductive path 15), the switching element 24 for reverse flow protection is located on the secondary-side power supply conductive path (the second conductive path 16), and the switching element 22 for reverse connection protection is located on the third conductive path 18 near the reference conductive path 17. That is, the switching elements 20, 22, 24, which generate heat, can be dispersed, so that a local temperature rise can be further suppressed.

Next, advantageous effects that can be achieved using the configuration shown in FIG. 1 will be specifically described in comparison with the comparative example shown in FIG. 11.

In the following comparative description, it is assumed that the step-down ratio is ¼ in both FIG. 1 and FIG. 11, in order to make a comparison under the same conditions. It is also assumed that, in both the DC-DC converter 1 shown in FIG. 1 and the DC-DC converter 100 shown in FIG. 11 as a comparative example, approximately 200 A of current flows on the secondary side (the low-voltage side), approximately 50 A of current flows on the primary-side (the high-voltage side), and approximately 150A of current flows through the path between the voltage conversion unit and the ground (the path through which a path flows in the event of reverse connection). Since the withstand voltage required for elements are different on the primary-side, the secondary-side, and the ground side, it is assumed that the switching elements arranged on the primary-side have a withstand voltage of 80 V and an ON resistance of 5 mΩ, and the switching elements arranged on the secondary-side and the ground side have a withstand voltage of 40 V and an ON resistance of 2 mΩ. However, in the comparative example shown in FIG. 11, if the switching element 104 on the high-side breaks down in an ON state, a primary-side voltage is applied to switching elements 108A and 108B, and therefore the switching elements 108A and 108B are required to have a withstand voltage that is as high as that of the switching elements on the primary-side. Therefore, the switching elements 108A and 108B have a withstand voltage of 80 V and an ON resistance of 5 mΩ.

First, a loss reduction effect will be described.

When a comparison is made under the above-described conditions, in the DC-DC converter 100 shown in FIG. 11, the ON resistance of the switching elements 108A and 108B for both short circuit protection and reverse connection protection is 5 mΩ, the switching elements 108A and 108B are arranged in parallel, and therefore conduction loss in the switching elements 108A and 108B is approximately 100 W. That is, the total of losses in the elements for short circuit protection and reverse connection protection is approximately 100 W.

In contrast, in the configuration shown in FIG. 1, the ON resistance of the switching element 20 for short circuit protection is 5 mΩ, and therefore conduction loss in the switching element 20 is approximately 12.5 W. Similarly, the ON resistance of the switching element 22 for reverse connection protection is 2 mΩ, and therefore conduction loss in the switching element 22 is approximately 45 W. That is, the total of losses in the elements for short circuit protection and reverse connection protection is approximately 57.5 W. In this way, if attention is paid to short circuit protection and reverse connection protection, the configuration according to the first embodiment shown in FIG. 1 can further reduce conduction loss, and achieve a greater loss reduction effect.

Next, a heat source dispersion effect will be described.

In the DC-DC converter 100 shown in FIG. 11, a loss in the switching elements 108A and 108B is 100 W, conduction loss in the switching element 110 is approximately 80 W, and therefore a total conduction loss of approximately 180 W is generated on the secondary-side. That is, heat that corresponds to 180 W is locally generated in the power supply line on the secondary-side. In contrast, in the DC-DC converter 1 shown in FIG. 1, the switching element 24, in which conduction loss of approximately 80 W is caused, the switching element 20, in which conduction loss of approximately 12.5 W is caused, and the switching element 22, in which conduction loss of approximately 45 W is caused, are dispersed on different paths. Therefore, it is possible to suppress a local temperature rise, and it is easier to achieve incidental effects such as simplification of a heat dissipation mechanism.

Second Embodiment

Next, a second embodiment will be described, mainly with reference to FIG. 2.

Figure 2:
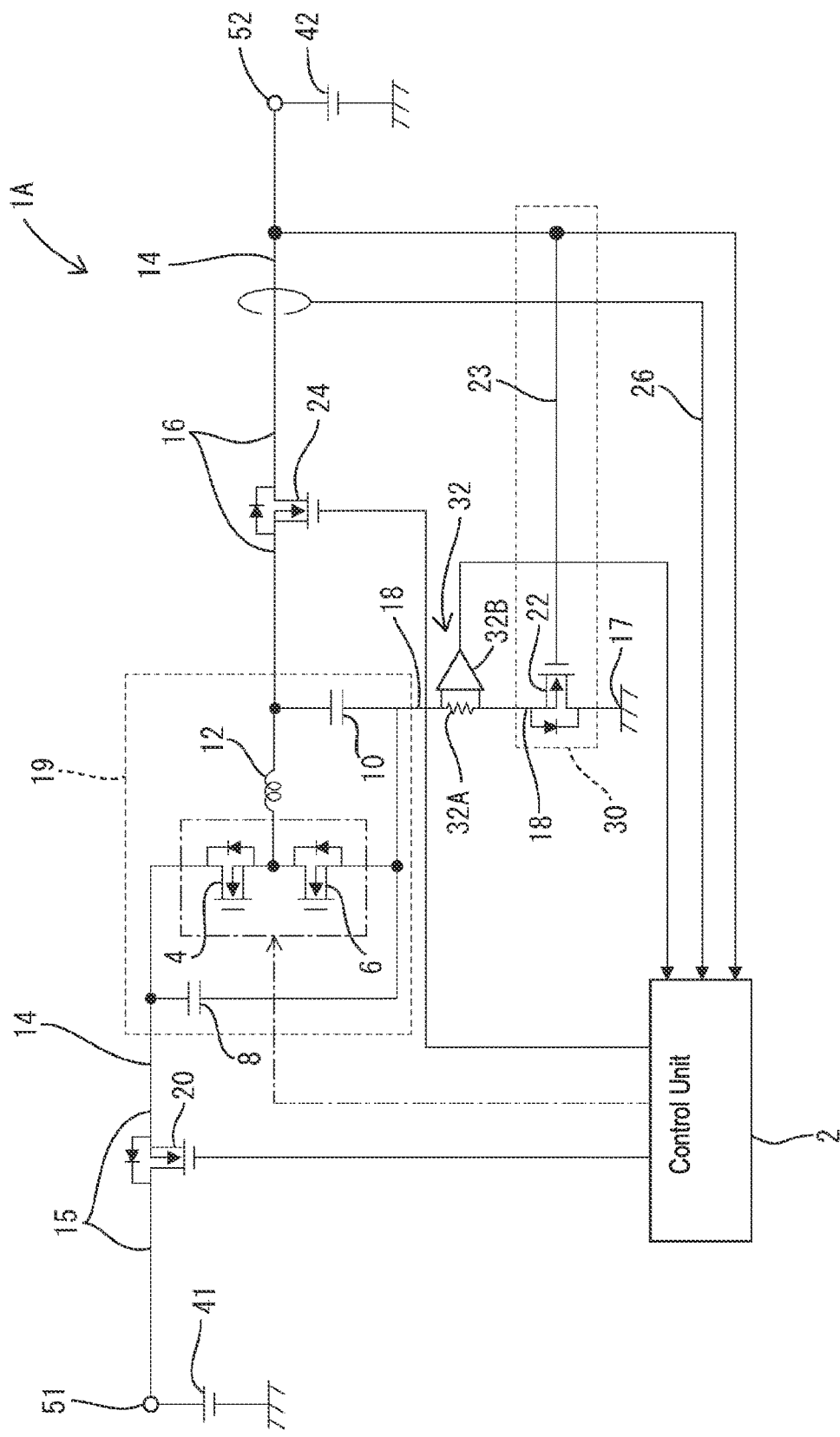
FIG. 2 is a circuit diagram schematically illustrating a DC-DC converter according to a second embodiment.

A DC-DC converter 1A according to the second embodiment shown in FIG. 2 has a configuration that is more specific than the configuration of the DC-DC converter 1 according to the first embodiment. The DC-DC converter 1A has all of the components and features of the above-described DC-DC converter 1 according to the first embodiment, as well as additional components and functions. Therefore, in FIG. 2, components that are the same as those in the first embodiment are given reference numerals that are the same as those in FIG. 1, and detailed descriptions of the same components will be omitted. The circuit configuration of the DC-DC converter 1A according to the second embodiment shown in FIG. 2 is different from the circuit configuration of the DC-DC converter 1 according to the first embodiment shown in FIG. 1 only in that a current detection unit 32 is added to the third conductive path 18, and the circuit configuration of the DC-DC converter 1A is otherwise the same as the circuit configuration of the DC-DC converter 1 according to the first embodiment.

As shown in FIG. 2, the DC-DC converter 1A includes the current detection unit 32 that detects a current flowing through the conductive path (the third conductive path 18) between the source of the low-side switching element 6 and the reference conductive path 17. The current detection unit 32 is configured to output a voltage value that corresponds to the current flowing through the third conductive path 18, as a detection value. In the example shown in FIG. 2, the current detection unit 32 includes a resistor 32A (a shunt resistor) and a differential amplifier 32B. A voltage across the resistor 32A is input to the differential amplifier 32B, an amount of voltage drop caused in the resistor 32A by the third conductive path 18 is amplified by the differential amplifier 32B, and the differential amplifier 32B outputs the resulting value to the control unit 2 as a detection value. In the example shown in FIG. 2, one end of the resistor 32A is electrically connected to the respective electrodes of the source of the switching element 6, the input-side capacitor 8, and the output-side capacitor 10, and the other end of the resistor 32A is connected to the source of the switching element 22. The total of currents flowing through the respective paths of the switching element 6, the input-side capacitor 8, and the output-side capacitor 10 is detected by the current detection unit 32.

The DC-DC converter 1A shown in FIG. 2 includes the same components and functions as the abnormal state detection unit included in the DC-DC converter 1 according to the first embodiment. Furthermore, the control unit 2 and the current detection unit 32 serve as the abnormal state detection unit, and can detect the predetermined overcurrent state of a current flowing through the third conductive path 18, as an abnormal state. Specifically, the control unit 2 compares a current value I3 at a predetermined position on the third conductive path 18 (the position at which the resistor 32A is provided) with a predetermined current threshold value Ith3, based on a detection value output from the current detection unit 32, to determine whether or not I3>Ith3 is satisfied. In this example, the state in which I3>Ith3 is satisfied is an example of the predetermined overcurrent state.

In addition, in this example, at least the control unit 2 and the switching element 20 serve as the first protection circuit unit, and at least the control unit 2 and the switching element 24 serve as the third protection circuit unit. The components that serve as the first protection circuit unit and the third protection circuit unit operate to switch the switching element 20 and the switching element 24 to an OFF state upon an overcurrent state of the third conductive path 18 being detected. Specifically, if the control unit 2 detects that I3>Ith3 is satisfied, the components respectively output OFF signals to switch both the switching element 20 and the switching element 24 to an OFF state.

With this configuration, it is possible to switch both the second switching element 20 and the fourth switching element 24 to an OFF state upon an excessive current flowing through the voltage conversion unit 19 due to an internal failure, for example. Therefore, it is possible to prevent a current from the primary-side power supply unit 41 from flowing into the voltage conversion unit 19, and to prevent a current from the secondary-side power supply unit 42 from flowing into the voltage conversion unit 19. In this way, it is possible to prevent overcurrents in the voltage conversion unit 19 by blocking currents from both power supply units, and it is possible to prevent a failure such as abnormal heat generation from occurring.

With the configuration shown in FIG. 2, even when a short circuit fault occurs in the input-side capacitor 8, the switching element 6, or the output-side capacitor 10, for example, an excessive current flows through the resistor 32A of the current detection unit 32. Therefore, it is possible to reliably detect an excessive current in the event of a short circuit fault, and it is possible to reliably prevent a current from flowing into the inside in such an event.

Note that the DC-DC converter 1A according to the second embodiment has all of the components and features of the DC-DC converter 1 according to the first embodiment. Therefore, the DC-DC converter 1A has, in addition to the above-described functions, also all of the functions described in the first embodiment (the function of protecting a circuit from an overcurrent state and an overvoltage state that occur in the power supply conductive path 14, functions that are relevant to reverse connection protection, functions that are relevant to reverse flow protection, and so on), and these functions realize the same effects as in the first embodiment.

Third Embodiment

Next, a third embodiment will be described, mainly with reference to FIG. 3.

Figure 3:
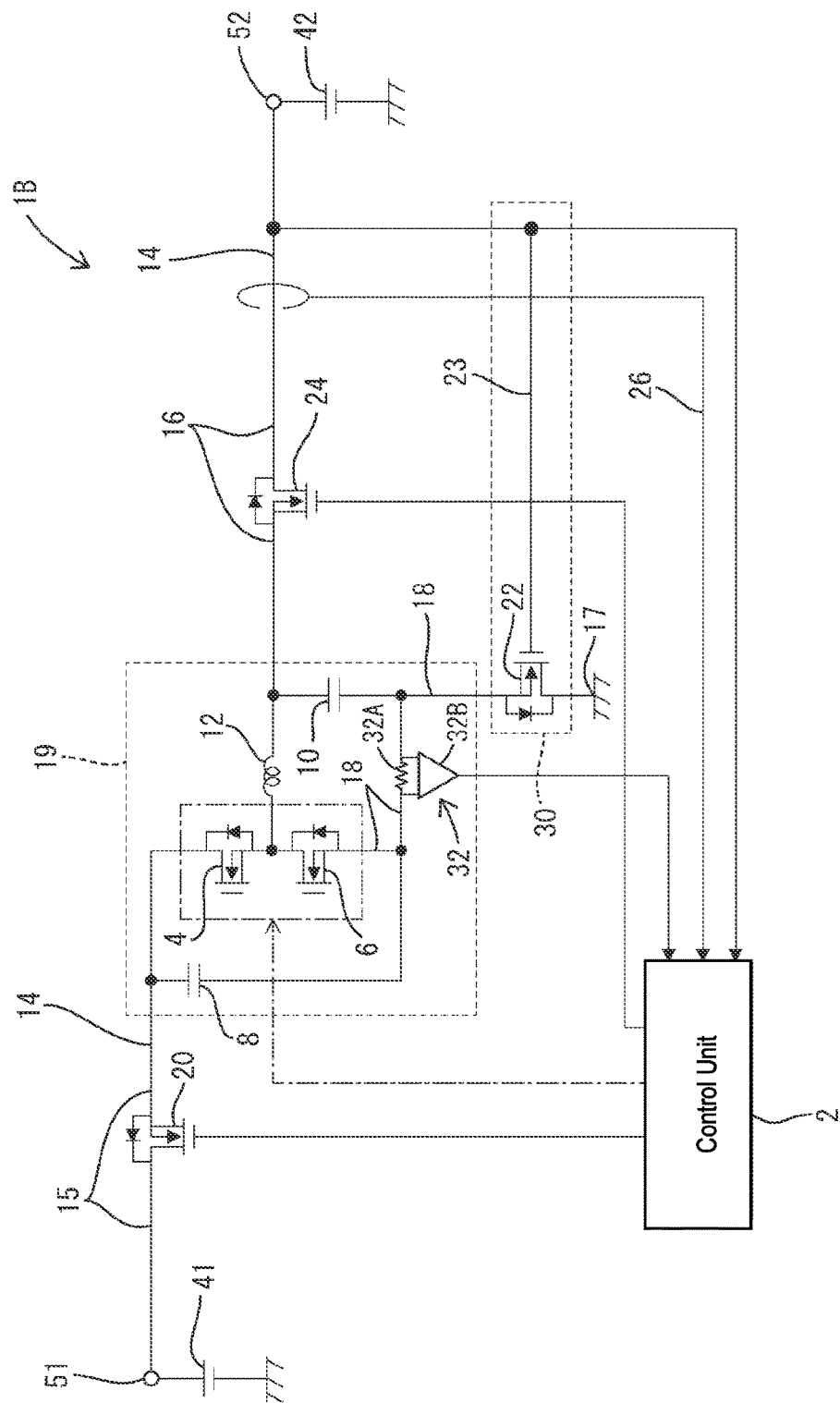
FIG. 3 is a circuit diagram schematically illustrating a DC-DC converter according to a third embodiment.

A DC-DC converter 1B according to the third embodiment shown in FIG. 3 has a configuration that is more specific than the configuration of the DC-DC converter 1 according to the first embodiment. The DC-DC converter 1B has all of the components and features of the above-described DC-DC converter 1 according to the first embodiment as well as additional components and functions. Therefore, in FIG. 3, components that are the same as those in the first embodiment are given reference numerals that are the same as those in FIG. 1, and detailed descriptions of the same components will be omitted. The circuit configuration of the DC-DC converter 1B according to the third embodiment shown in FIG. 3 is different from the circuit configuration of the DC-DC converter 1 according to the first embodiment shown in FIG. 1 only in that the current detection unit 32 is added to the third conductive path 18, and the circuit configuration of the DC-DC converter 1B is otherwise the same as the circuit configuration of the DC-DC converter 1 according to the first embodiment.

As shown in FIG. 3, the DC-DC converter 1B includes the current detection unit 32 that detects a current flowing through the conductive path (the third conductive path 18) between the source of the low-side switching element 6 and the reference conductive path 17. The configuration and functions of the current detection unit 32 are the same as those of the current detection unit 32 that is used in the DC-DC converter 1A (FIG. 2). In the example shown in FIG. 3, one end of the resistor 32A is electrically connected to the source of the switching element 6 and an electrode of the input-side capacitor 8, and the other end of the resistor 32A is electrically connected to the electrode of the output-side capacitor 10 and the source of the switching element 22. The total of currents flowing through the switching element 6 and the input-side capacitor 8 is detected by the current detection unit 32.

The DC-DC converter 1B shown in FIG. 3 includes the same components and functions as the abnormal state detection unit included in the DC-DC converter 1 according to the first embodiment. Furthermore, the control unit 2 and the current detection unit 32 serve as the abnormal state detection unit, and can detect the predetermined overcurrent state of a current flowing through the third conductive path 18, as an abnormal state. Specifically, the control unit 2 compares a current value I3 at a predetermined position on the third conductive path 18 (the position at which the resistor 32A is provided) with a predetermined current threshold value Ith3, based on a detection value output from the current detection unit 32, to determine whether or not I3>Ith3 is satisfied. Also in this example, the state in which I3>Ith3 is satisfied is an example of the predetermined overcurrent state.

In addition, also in this example, at least the control unit 2 and the switching element 20 serve as the first protection circuit unit, and at least the control unit 2 and the switching element 24 serve as the third protection circuit unit. The components that serve as the first protection circuit unit and the third protection circuit unit operate to switch the switching element 20 and the switching element 24 to an OFF state upon an overcurrent state of the third conductive path 18 being detected. Specifically, upon determining that I3>Ith3 is satisfied, the control unit 2 outputs an OFF signal to the switching element 20 and the switching element 24 to switch both the switching element 20 and the switching element 24 to an OFF state.

With this configuration as well, it is possible to switch both the second switching element 20 and the fourth switching element 24 to an OFF state upon an excessive current flowing through the voltage conversion unit 19 due to an internal failure, for example. Therefore, it is possible to prevent a current from the primary-side power supply unit 41 from flowing into the voltage conversion unit 19, and to prevent a current from the secondary-side power supply unit 42 from flowing into the voltage conversion unit 19. Also, with the configuration shown in FIG. 3, even when a short circuit fault occurs in the input-side capacitor 8 or the switching element 6, for example, an excessive current flows through the resistor 32A of the current detection unit 32. Therefore, it is possible to reliably detect an excessive current in the event of a short circuit fault, and it is possible to reliably prevent a current from flowing into the inside in such an event.

Note that the DC-DC converter 1B according to the third embodiment also has all of the components and features of the DC-DC converter 1 according to the first embodiment. Therefore, the DC-DC converter 1B has, in addition to the above-described functions, all of the functions described in the first embodiment (the function of protecting a circuit from an overcurrent state and an overvoltage state that occur in the power supply conductive path 14, functions that are relevant to reverse connection protection, functions that are relevant to reverse flow protection, and so on), and these functions realize the same effects as in the first embodiment.

Fourth Embodiment

Next, a fourth embodiment will be described, mainly with reference to FIG. 4.

Figure 4:
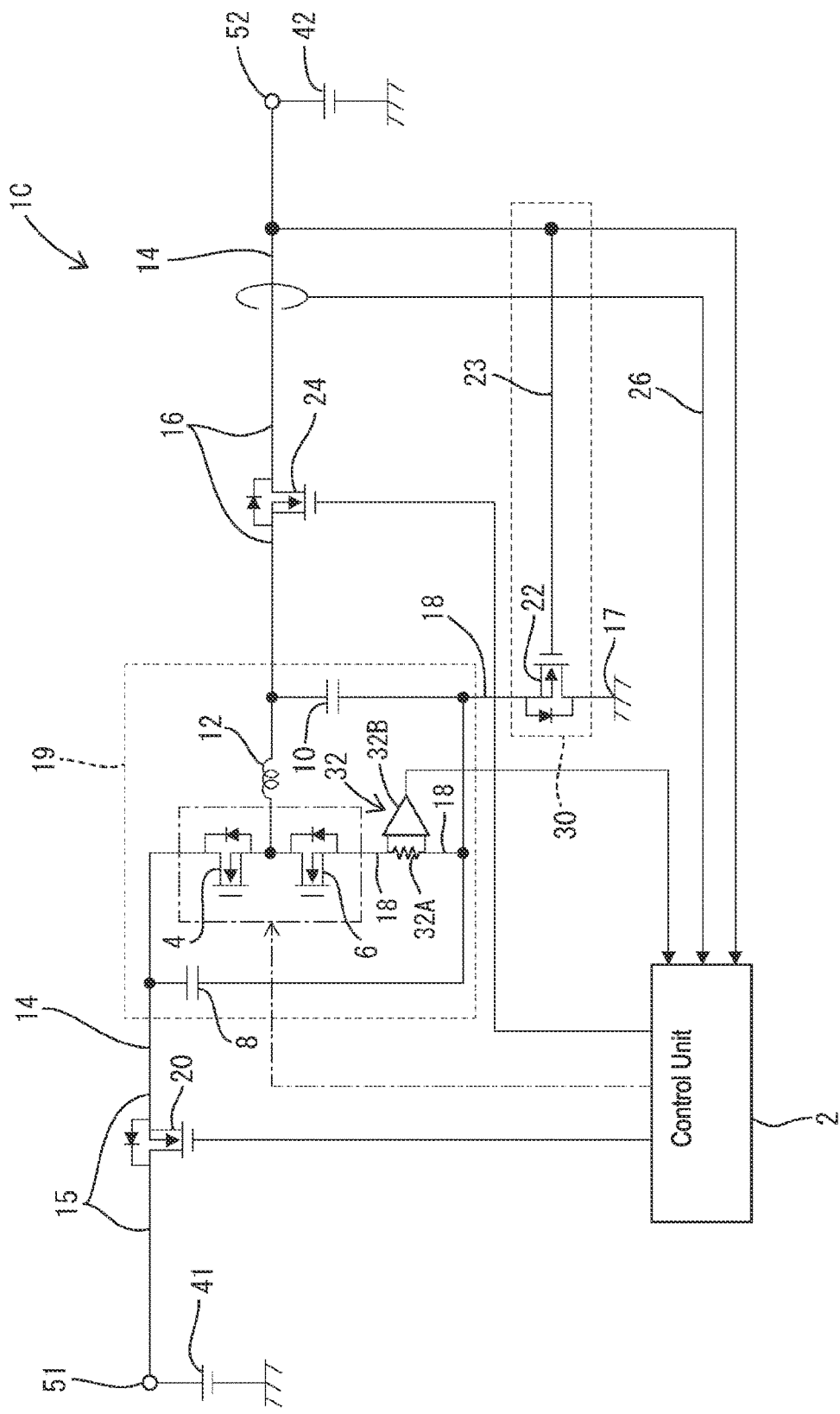
FIG. 4 is a circuit diagram schematically illustrating a DC-DC converter according to a fourth embodiment.

A DC-DC converter 1C according to the fourth embodiment shown in FIG. 4 has a configuration that is more specific than the configuration of the DC-DC converter 1 according to the first embodiment. The DC-DC converter 1C has all of the components and features of the above-described DC-DC converter 1 according to the first embodiment as well as additional components and functions. Therefore, in FIG. 4, components that are the same as those in the first embodiment are given reference numerals that are the same as those in FIG. 1, and detailed descriptions of the same components will be omitted. The circuit configuration of the DC-DC converter 1C according to the fourth embodiment shown in FIG. 4 is different from the circuit configuration of the DC-DC converter 1 according to the first embodiment shown in FIG. 1 only in that the current detection unit 32 is added to the third conductive path 18, and the circuit configuration of the DC-DC converter 1C is otherwise the same as the circuit configuration of the DC-DC converter 1 according to the first embodiment.

As shown in FIG. 4, the DC-DC converter 1C includes the current detection unit 32 that detects a current flowing through the conductive path (the third conductive path 18) between the source of the low-side switching element 6 and the reference conductive path 17. The configuration and functions of the current detection unit 32 are the same as those of the current detection unit 32 that is used in the DC-DC converter 1A (FIG. 2). In the example shown in FIG. 4, one end of the resistor 32A is electrically connected to the source of the switching element 6, and the other end of the resistor 32A is electrically connected to the electrodes of the input-side capacitor 8 and the output-side capacitor 10, and the source of the switching element 22. A current flowing through the switching element 6 is detected by the current detection unit 32.

The DC-DC converter 1C shown in FIG. 4 includes the same components and functions as the abnormal state detection unit included in the DC-DC converter 1 according to the first embodiment. Furthermore, the control unit 2 and the current detection unit 32 serve as the abnormal state detection unit, and can detect the predetermined overcurrent state of a current flowing through the third conductive path 18, as an abnormal state. Specifically, the control unit 2 compares a current value I3 at a predetermined position on the third conductive path 18 (the position at which the resistor 32A is provided) with the predetermined current threshold value Ith3, based on a detection value output from the current detection unit 32, to determine whether or not I3>Ith3 is satisfied. Also in this example, the state in which I3>Ith3 is satisfied is an example of the predetermined overcurrent state.

In addition, also in this example, at least the control unit 2 and the switching element 20 serve as the first protection circuit unit, and at least the control unit 2 and the switching element 24 serve as the third protection circuit unit. The components that serve as the first protection circuit unit and the third protection circuit unit operate to switch the switching element 20 and the switching element 24 to an OFF state upon an overcurrent state of the third conductive path 18 being detected. Specifically, upon determining that I3>Ith3 is satisfied, the control unit 2 outputs an OFF signal to the switching element 20 and the switching element 24 to switch both the switching element 20 and the switching element 24 to an OFF state.

With this configuration as well, it is possible to switch both the second switching element 20 and the fourth switching element 24 to an OFF state upon an excessive current flowing through the voltage conversion unit 19 due to an internal failure, for example. Therefore, it is possible to prevent a current from the primary-side power supply unit 41 from flowing into the voltage conversion unit 19, and to prevent a current from the secondary-side power supply unit 42 from flowing into the voltage conversion unit 19. Also, with the configuration shown in FIG. 4, even when a short circuit fault occurs in the switching element 6, for example, an excessive current flows through the resistor 32A of the current detection unit 32. Therefore, it is possible to reliably detect an excessive current in the event of a short circuit fault, and it is possible to reliably prevent a current from flowing into the inside in such an event.

Note that the DC-DC converter 1C according to the fourth embodiment also has all of the components and features of the DC-DC converter 1 according to the first embodiment. Therefore, the DC-DC converter 1C has, in addition to the above-described functions, all of the functions described in the first embodiment (the function of protecting a circuit from an overcurrent state and an overvoltage state that occur in the power supply conductive path 14, functions that are relevant to reverse connection protection, functions that are relevant to reverse flow protection, and so on), and these functions realize the same effects as in the first embodiment.

Fifth Embodiment

Figure 5:
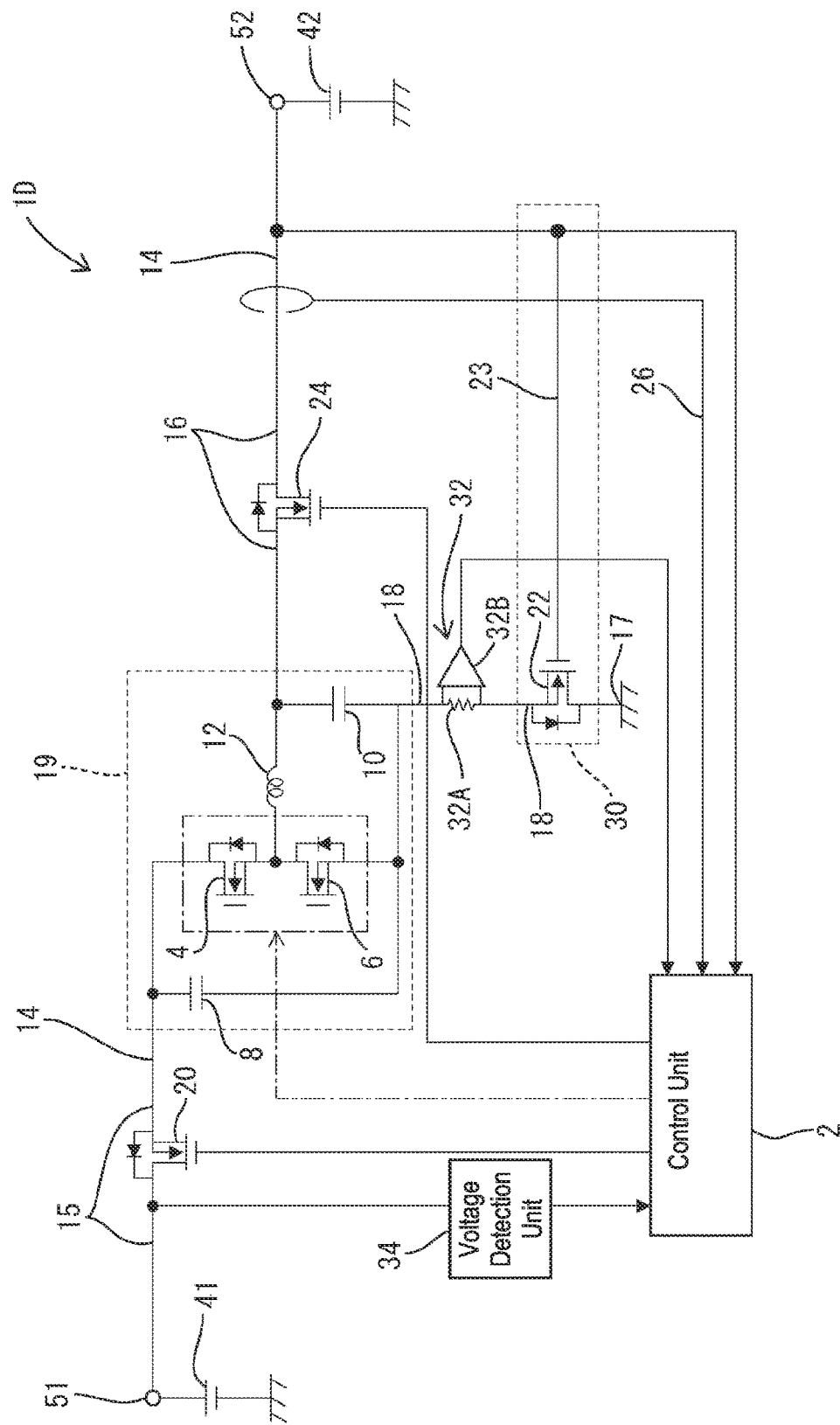
FIG. 5 is a circuit diagram schematically illustrating a DC-DC converter according to a fifth embodiment.

A DC-DC converter 1D according to the fifth embodiment shown in FIG. 5 has all of the components and features of the above-described DC-DC converter 1A according to the second embodiment, as well as additional components and functions. Therefore, in FIG. 5, components that are the same as those in the second embodiment are given reference numerals that are the same as those in FIG. 2, and detailed descriptions of the same components will be omitted. Note that the circuit configuration of the DC-DC converter 1D according to the fifth embodiment shown in FIG. 5 is different from the circuit configuration according to the second embodiment shown in FIG. 2 only in that a voltage on the first conductive path 15 can be detected, and the circuit configuration of the DC-DC converter 1D is otherwise the same as the circuit configuration of the DC-DC converter 1A according to the second embodiment.

The DC-DC converter 1D shown in FIG. 5 includes a voltage detection unit 34 that detects a voltage on the first conductive path 15. The voltage detection unit 34 is configured as a well-known voltage detection circuit, and is configured to input a detection value that corresponds to the value of a voltage on the first conductive path 15 (such as a divided voltage value obtained by dividing a voltage on the first conductive path 15, using a voltage divider circuit), to the control unit 2.

In this configuration, at least the voltage detection unit 34 and the control unit 2 constitute an example of the abnormal state detection unit, and function to detect the predetermined overvoltage state of at least the first conductive path 15 as an abnormal state. Specifically, the control unit 2 compares a value V1 of a voltage on the first conductive path 15 with a predetermined threshold value Vth1, based on a detection value obtained by the voltage detection unit 34. If V1≤Vth1 is satisfied, the control unit 2 determines that the first conductive path 15 is not in an overvoltage state, and if V1>Vth1 is satisfied, the control unit 2 determines that the first conductive path 15 is in an overvoltage state. Thus, the control unit 2 detects an abnormal state of the power supply conductive path 15. In this example, the state in which V1>Vth1 is satisfied is an example of the predetermined overvoltage state.

In the DC-DC converter 1D shown in FIG. 5, at least the control unit 2 and the switching element 20 serve as the first protection circuit unit, and operate to switch the switching element 20 (the second switching element) to an OFF state upon an overvoltage state of the first conductive path 15 being detected. Specifically, upon determining that V1>Vth1 is satisfied, the control unit 2 outputs an OFF signal to the switching element 20 to switch the switching element 20 to an OFF state.

As shown in FIG. 5, if the secondary-side power supply unit 42 is configured as the low-voltage side power supply unit, the primary-side power supply unit 41 is configured as the high-voltage side power supply unit, and the voltage conversion unit 19 is configured to step down a DC voltage applied to the first conductive path 15 and output the resulting voltage to the second conductive path 16, and if an excessive voltage is applied to the high-voltage side conductive path (the first conductive path 15) on the input side, and such a state continues, there is concern that the risk of a failure occurring in the DC-DC converter 1D increases. In this regard, with the above-described configuration, the second switching element 20 is brought into an OFF state upon an overvoltage state of the first conductive path 15 being detected. Thus, it is possible to prevent a current from flowing into the voltage conversion unit 19 via the high-voltage side conductive path (the first conductive path 15). Therefore, it is possible to prevent an internal failure from occurring due to an excessive voltage on the first conductive path 15. In addition, as a result of such a countermeasure being taken, it is possible to lower the withstand voltage of components that are located downstream of the second switching element 20.

Note that the DC-DC converter 1D shown in FIG. 5 also has all of the components and features of the DC-DC converter 1A according to the second embodiment. Therefore, the DC-DC converter 1D has, in addition to the above-described functions, all of the functions described in the first and second embodiments (the function of protecting a circuit from an overcurrent state and an overvoltage state that occur in the power supply conductive path 14, functions that are relevant to reverse connection protection, functions that are relevant to reverse flow protection, the function of protecting a circuit from an overcurrent state that occurs in the third conductive path 18, and so on), and these functions realize the same effects as in the second embodiment.

Sixth Embodiment

Next, a sixth embodiment will be described, mainly with reference to FIG. 6.

Figure 6:
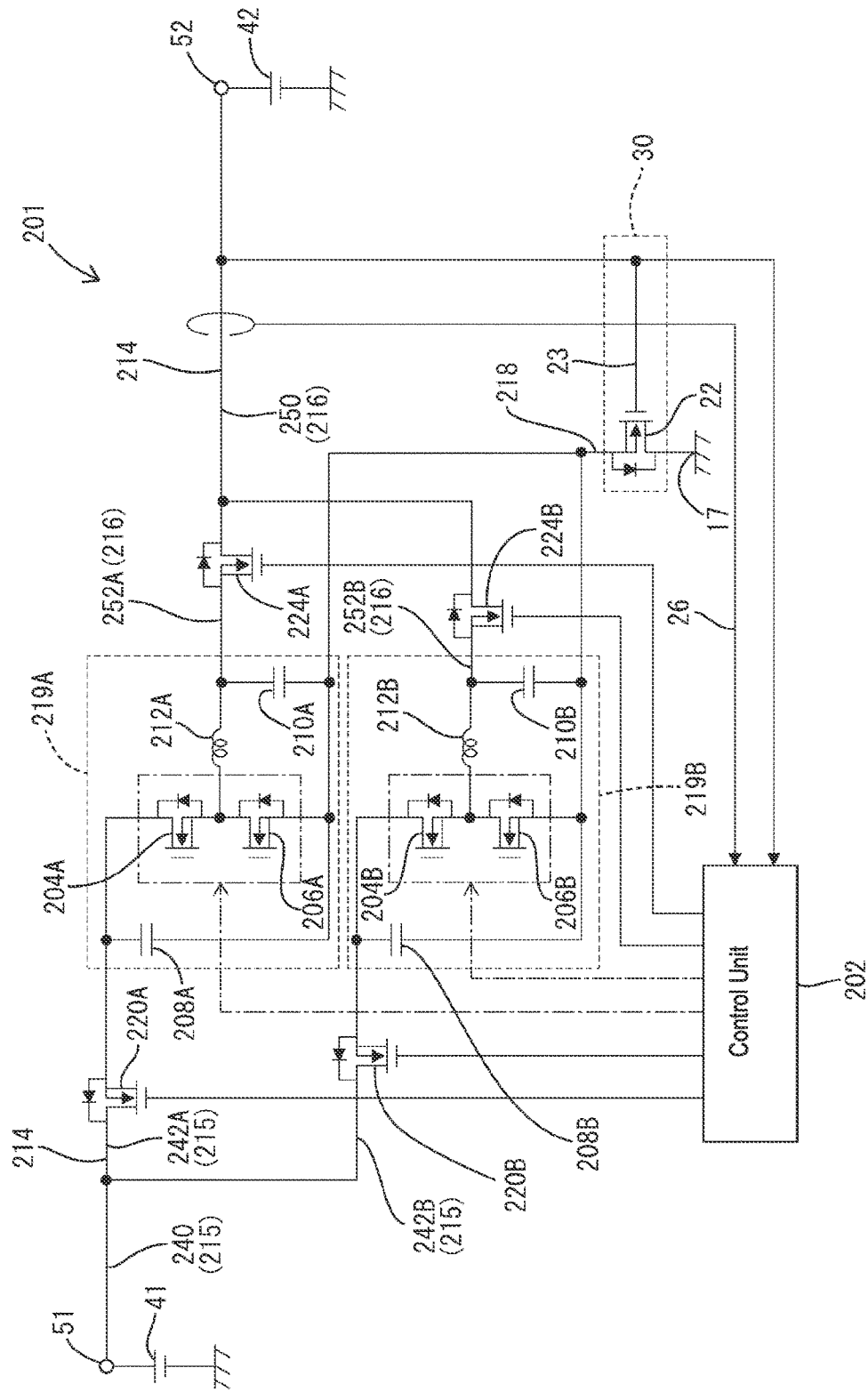
FIG. 6 is a circuit diagram schematically illustrating a DC-DC converter according to a sixth embodiment.

A DC-DC converter 201 shown in FIG. 6 is different from the DC-DC converter 1 according to the first embodiment in terms of circuit configuration, mainly in that the DC-DC converter 201 is of a multiphase type. Note that, in the following description, components that are the same as those of the DC-DC converter 1 according to the first embodiment are given reference numerals that are the same as those given to the DC-DC converter 1 shown in FIG. 1, and detailed descriptions of the same components will be omitted.

The DC-DC converter 201 in FIG. 6 includes a power supply conductive path 214 that is a path through which an input and output current flows, and a reference conductive path 17 that is maintained at a constant reference potential (a ground potential) that is lower than the potential of the power supply conductive path 214. A plurality of voltage conversion units 219A and 219B are provided in parallel between a first conductive path 215 and a second conductive path 216 that constitute the power supply conductive path 214. The voltage conversion units 219A and 219B generate an output voltage that is to be applied to the second conductive path 216, by stepping down an input voltage applied to the first conductive path 215.

The first conductive path 215 is configured as a primary-side (high-voltage side) power supply line to which a relatively high voltage is applied. The first conductive path 215 is electrically connected to the high-potential side terminal of the primary-side power supply unit 41, and a predetermined DC voltage (e.g. 48 V) from the primary-side power supply unit 41 is applied to the first conductive path 215. The first conductive path 215 includes a shared input path 240 that is electrically connected to the high-potential side terminal of the primary-side power supply unit 41, and a plurality of individual input paths 242A and 242B that branch off from the shared input path 240. The plurality of individual input paths 242A and 242B are respectively connected to the plurality of voltage conversion units 219A and 219B.

The second conductive path 216 is configured as a secondary-side (low-voltage side) power supply line to which a relatively low voltage is applied. The second conductive path 216 is electrically connected to the high-potential side terminal of the secondary-side power supply unit 42, and a predetermined DC voltage (e.g. 12 V) from the secondary-side power supply unit 42, which is lower than the output voltage from the primary-side power supply unit 41, is applied to the second conductive path 216. The second conductive path 216 includes a plurality of individual output paths 252A and 252B that are respectively connected to the plurality of voltage conversion units 219A and 219B, and a shared output path 250 to which the individual output paths 252A and 252B are commonly connected, and which is electrically connected to the high-potential side terminal of the secondary-side power supply unit 42.

The reference conductive path 17 is configured as a ground, and is maintained at a constant ground potential (0 V). Also in the configuration shown in FIG. 6, the low-potential side terminal of the primary-side power supply unit 41 and the low-potential side terminal of the secondary-side power supply unit 42 are connected to the reference conductive path 17, and furthermore, the drain of the switching element 22 is connected to the reference conductive path 17.

The voltage conversion units 219A and 219B serve as synchronous rectification type step-down converters. The voltage conversion unit 219A includes switching elements 204A and 206A, an input-side capacitor 208A, an output-side capacitor 210A, and a coil 212A. Similarly, the voltage conversion unit 219B includes switching elements 204B and 206B, an input-side capacitor 208B, an output-side capacitor 210B, and a coil 212B. The switching elements 204A and 204B respectively on the high side of the voltage conversion units 219A and 219B are switching elements that individually turn ON and OFF an input DC voltage applied to the first conductive path 215, and are equivalent to the first switching element.

In the voltage conversion unit 219A, the respective electrodes of the input-side capacitor 208A and the output-side capacitor 210A are connected to the source of the low-side switching element 206A. Similarly, in the voltage conversion unit 219B, the respective electrodes of the input-side capacitor 208B and the output-side capacitor 210B are connected to the source of the low-side switching element 206B. The sources of the switching elements 206A and 206B, the respective electrodes of the input-side capacitors 208A and 208B, and the respective electrodes of the output-side capacitor 210A and 210B are electrically connected to each other, and are connected to the source of the switching element 22 via a third conductive path 218.

The far end of the coil 212A in the voltage conversion unit 219A is connected to one electrode of the output-side capacitor 210A and the source of the switching element 224A. Similarly, the far end of the coil 212B in the voltage conversion unit 219B is connected to one electrode of the output-side capacitor 210B and the source of the switching element 224B. The drains of the switching elements 224A and 224B are electrically connected to each other, and are connected to the shared output path 250.

The configuration above is the basic configuration of the DC-DC converter 201, and the DC-DC converter 201 performs a step-down operation, using the two voltage conversion units 219A and 219B. One of the voltage conversion units, namely the voltage conversion unit 219A, steps down the DC voltage applied to the first conductive path 215, by performing an operation to turn ON and OFF the switching element 204A in response to a signal from a control unit 202, and performing an operation to turn ON and OFF the switching element 206A in synchronization with the aforementioned operation, and outputs the resulting voltage to the second conductive path 216. The same applies to the other voltage conversion unit, namely the voltage conversion unit 219B. The voltage conversion unit 219B steps down the DC voltage applied to the first conductive path 215, by performing an operation to turn ON and OFF the switching element 204B in response to a signal from the control unit 202, and performing an operation to turn ON and OFF the switching element 206B in synchronization with the aforementioned operation, and outputs the resulting voltage to the second conductive path 216. Note that the timing at which a driving signal is supplied to the two voltage conversion units 219A and 219B is not specifically limited. For example, the voltage conversion unit 219A and the voltage conversion unit 219B may be operated by using a well-known control method so as to be out of phase.

The DC-DC converter 201 shown in FIG. 6 also has the same reverse connection protection function as in the first embodiment. The reverse connection protection circuit unit 30 provided in the DC-DC converter 201 has the same configuration as the reverse connection protection circuit unit 30 of the DC-DC converter 1 shown in FIG. 1, and functions in the same manner.

The following describes, from among the functions of the DC-DC converter 201, the function of protecting a circuit from an overcurrent state and an overvoltage state that occur in the power supply conductive path 214 due to a short circuit, for example. Note that an overcurrent state and an overvoltage state that occur in the power supply conductive path 214 are examples of the predetermined abnormal state.

The current detection path 26 for detecting a current flowing through the second conductive path 216 is formed in the DC-DC converter 201 as well. This current detection path 26 has the same configuration as that in the first embodiment, and current detection is also performed by the control unit 202 in the same manner as in the first embodiment. The control unit 202 knows the current value Io of the shared output path 250 in the second conductive path 216.

The control unit 202 compares the current value Io of a current flowing through the shared output path 250 with the predetermined threshold value It. If Io≤It is satisfied, the control unit 202 determines that the power supply conductive path 214 is not in an overcurrent state, and if Io>It is satisfied, the control unit 202 determines that the power supply conductive path 214 is in an overcurrent state. Thus, the control unit 202 detects an abnormal state of the power supply conductive path 214. Similarly, the control unit 202 compares the voltage value Vo of the shared output path 250 with the predetermined threshold value Vt. If Vo≤Vt is satisfied, the control unit 202 determines that the power supply conductive path 214 is not in an overvoltage state, and if Vo>Vt is satisfied, the control unit 202 determines that the power supply conductive path 214 is in an overvoltage state. Thus, the control unit 202 detects an abnormal state of the power supply conductive path 214.

The two individual input paths 242A and 242B included in the first conductive path 215 are respectively provided with switching elements 220A and 220B that are each configured as a MOSFET. The switching elements 220A and 220B are examples of the second switching element. Due to the presence of these switching elements, the plurality of individual input paths 242A and 242B are individually switchable to a blocked state (an OFF state in which a current flowing in the direction toward the voltage conversion unit is blocked) and an unblocked state (an ON state). For example, if overcurrent or overvoltage occurs in the power supply conductive path 214 due to a short circuit, the switching elements 220A and 220B can function to protect a circuit from such an abnormality, and can serve as switching elements for short circuit protection.

In this example, while the control unit 202 is detecting that the current value Io of the shared output path 250 is smaller than or equal to the threshold value It, and that the voltage value Vo of the shared output path 250 is smaller than or equal to the threshold value Vt, an ON signal is continuously output from the control unit 202 to the gates of the switching elements 220A and 220B. While the switching elements 220A and 220B are maintained in an ON state (i.e. the period during which a blocked state is cancelled), paths between the primary-side power supply unit 41 and the voltage conversion units 219A and 219B are in a conductive state, and a DC voltage that is generated in the primary-side power supply unit 41 is continuously input to the voltage conversion units 219A and 219B.

On the other hand, if the control unit 202 detects that the current value Io of the shared output path 250 is greater than the threshold value It, or the voltage value Vo of the shared output path 250 is greater than the threshold value Vt (if the control unit 202 detects an abnormal state of the power supply conductive path 214), an OFF signal is output from the control unit 202 to the gates of either one or all of the switching elements 220A and 220B. Note that the control unit 202 and the switching elements 220A and 220B constitute an example of the first protection circuit unit.

With the configuration in which all of the switching elements 220A and 220B are turned OFF upon the control unit 202 detecting an abnormal state, when an abnormal state (a state in which Io>It or Vo>Vt is satisfied) occurs, it is possible to block currents flowing through the individual input paths 242A and 242B in the direction toward the voltage conversion units 219A and 219B. Therefore, it is possible to completely block power supply from the primary side to the secondary side through the power supply conductive path 214.

If a configuration in which only a switching element on a path in which an abnormal state has occurred is turned OFF, the following operations may be performed.

For example, the control unit 202 enters a test mode at a predetermined timing (e.g. a timing at which the control unit 202 detects an abnormal state (a state in which Io>It or Vo>Vt is satisfied) of the power supply conductive path 214), and sequentially operates the plurality of voltage conversion units 219A and 219B. In this example, the control unit 202 is an example of the operation control unit that sequentially operates the plurality of voltage conversion units 219A and 219B.

Specifically, the control unit 202 drives only one of the voltage conversion units, namely the voltage conversion unit 219A, to perform an operation to turn ON and OFF the switching element 204A, and an operation to turn OFF and ON the switching element 206A in synchronization with the aforementioned operation. Thus, the control unit 202 operates the voltage conversion unit 219A to step down a DC voltage applied to the individual input path 242A, and output the resulting voltage to the individual output path 252A. While driving the voltage conversion unit 219A, the control unit 202 stops driving the other voltage conversion unit, namely the voltage conversion unit 219B, to maintain the switching elements 204A and 206A in an OFF state.

After performing control to drive only one of the voltage conversion units, namely the voltage conversion unit 219A, for a predetermined period, the control unit 202 now performs control to drive only the other voltage conversion unit, namely the voltage conversion unit 219B. Specifically, the control unit 202 outputs ON and OFF signals to only the other voltage conversion unit, namely the voltage conversion unit 219B, so that the voltage conversion unit 219B performs an operation to turn ON and OFF the switching element 204B and an operation to turn OFF and ON the switching element 206B in synchronization with the aforementioned operation, to step down a DC voltage applied to the individual input path 242B, and output the resulting voltage to the individual output path 252B. While driving the voltage conversion unit 219B, the control unit 202 stops driving the other voltage conversion unit, namely the voltage conversion unit 219A, to maintain the switching elements 204B and 206B in an OFF state.

If an abnormal state (where Io>It or Vo>Vt is satisfied) of the power supply conductive path 214 is detected while one of the two voltage conversion units 219A and 219B is operating, and an abnormal state is not detected while the other conversion unit is operating, the control unit 202 selectively turns OFF the element on the input path to the one of the voltage conversion units 219A and 219B from which an abnormal state was detected, and maintains the element on the input path to the other conversion unit from which an abnormal state was not detected, in an ON state. In this case, it is preferable that the control unit 202 selectively turns OFF the element on the output path from the one of the voltage conversion units 224A and 224B from which an abnormal state was detected, and maintains the element on the output path from the other conversion unit from which an abnormal state was not detected, in an ON state. Thereafter, a step down operation may be performed using only the other conversion unit from which an abnormal state was not detected.

For example, if an abnormal state (where Io>It or Vo>Vt is satisfied) of the power supply conductive path 214 is detected while the voltage conversion unit 219A is operating and the voltage conversion unit 219B is not operating, and if an abnormal state (where Io>It or Vo>Vt is satisfied) of the power supply conductive path 214 is not detected while the voltage conversion unit 219B is operating and the voltage conversion unit 219A is not operating, it is possible to detect that an abnormal state has occurred in a path for the voltage conversion unit 219A. In this case, the control unit 202 selectively turns OFF the switching element 220A on the input path to the voltage conversion unit 219A from which an abnormal state was detected, and maintains the switching element 220B on the input path to the voltage conversion unit 219B from which an abnormal state was not detected, in an ON state. In this case, it is preferable that the control unit 202 also selectively turns OFF the element 224A on the output path from the voltage conversion unit 219A from which an abnormal state was detected, and maintains the switching element 224B on the output path from the voltage conversion unit 219B from which an abnormal state was not detected, in an ON state. Thereafter, a step down operation may be performed using only the voltage conversion unit 219B from which an abnormal state was not detected.

As described above, with the configuration shown in FIG. 6, it is possible to realize a multiphase DC-DC converter that is provided with the function of protecting a circuit from an overcurrent state and an overvoltage state that occur in the power supply conductive path 214 due to a short circuit, for example, and the function of protecting a circuit from a reverse connection state, while further reducing conduction loss. Furthermore, since the above-described first protection circuit unit allows the individual input paths 242A and 242B to individually switch to an OFF state (a blocked state) and an ON state (an unblocked state), it is not necessary to invariably stop the operations of all of the voltage conversion units when a certain short circuit abnormality has occurred, and in some cases, it is possible to take a flexible countermeasure, e.g. to selectively stop the operations of some voltage conversion units.

Also, with the operation control unit that has the above-described configuration, it is possible to more accurately and efficiently detect a voltage conversion path in which an abnormality that causes an overcurrent state or an overvoltage state has occurred, from among a plurality of voltage conversion paths. Then, it is possible to selectively stop only the operations of a voltage conversion path in which an abnormality has occurred. In particular, since it is possible to continue the operations of a normal voltage conversion path in which an abnormality has not occurred, the configuration is advantageous in cases where it is desired that the operations are continued with respect to at least some of the phases.

The DC-DC converter 201 shown in FIG. 6 also has the same reverse flow protection function as in the first embodiment. Specifically, the control unit 202 detects a reverse flow occurring in the shared output path 250, in the same manner as in the first embodiment. The control unit 202 continuously outputs an ON signal to all of the gates of the switching elements 224A and 224B while detecting that the direction of a current flowing through the shared output path 250 is "the first direction" above (i.e. while detecting that the direction of a current flow is in a normal state). That is, when the direction of a current flowing through the shared output path 250 is normal, the switching elements 224A and 224B are constantly in an ON state. In contrast, the control unit 202 outputs an OFF signal to some or all of the gates of the switching element 224A and 224B upon detecting that the direction of a current flowing through the shared output path 250 is "the second direction" above (i.e. upon detecting that the direction of a current flow is in a reverse flow state).

With a configuration that turns OFF all of the switching elements 224A and 224B when the direction of a current has been detected as being in a reverse flow state, it is possible to completely block a current from the secondary-side power supply unit 42 side to the voltage conversion units 219A and 219B side through the second conductive path 216.

Instead, when the direction of a current has been detected as being in a reverse flow state, the voltage conversion units 219A and 219B may be sequentially driven such that one conversion unit does not operate while the other conversion unit is operating, and thus a path in which a reverse flow has occurred may be specified. For example, if a reverse flow is detected from the second conductive path 216 in a state where the voltage conversion unit 219A is operating and the voltage conversion unit 219B is not operating, and a reverse flow is not detected from the second conductive path 216 in a state where the voltage conversion unit 219A is not operating and the voltage conversion unit 219B is operating, it is possible to specify the voltage conversion unit 219A as the path in which a reverse flow has occurred. In cases where a path in which a reverse flow has occurred is specified in such a manner, control may be performed to continue the operations of a conversion unit in which a reverse flow has not occurred, by selectively turning OFF the switching element on the output path from the conversion unit from which a reverse flow has been detected, and maintaining the switching element on the output path from the conversion unit from which a reverse flow has not been detected.

Seventh Embodiment

Next, a seventh embodiment will be described, mainly with reference to FIG. 7.

Figure 7:
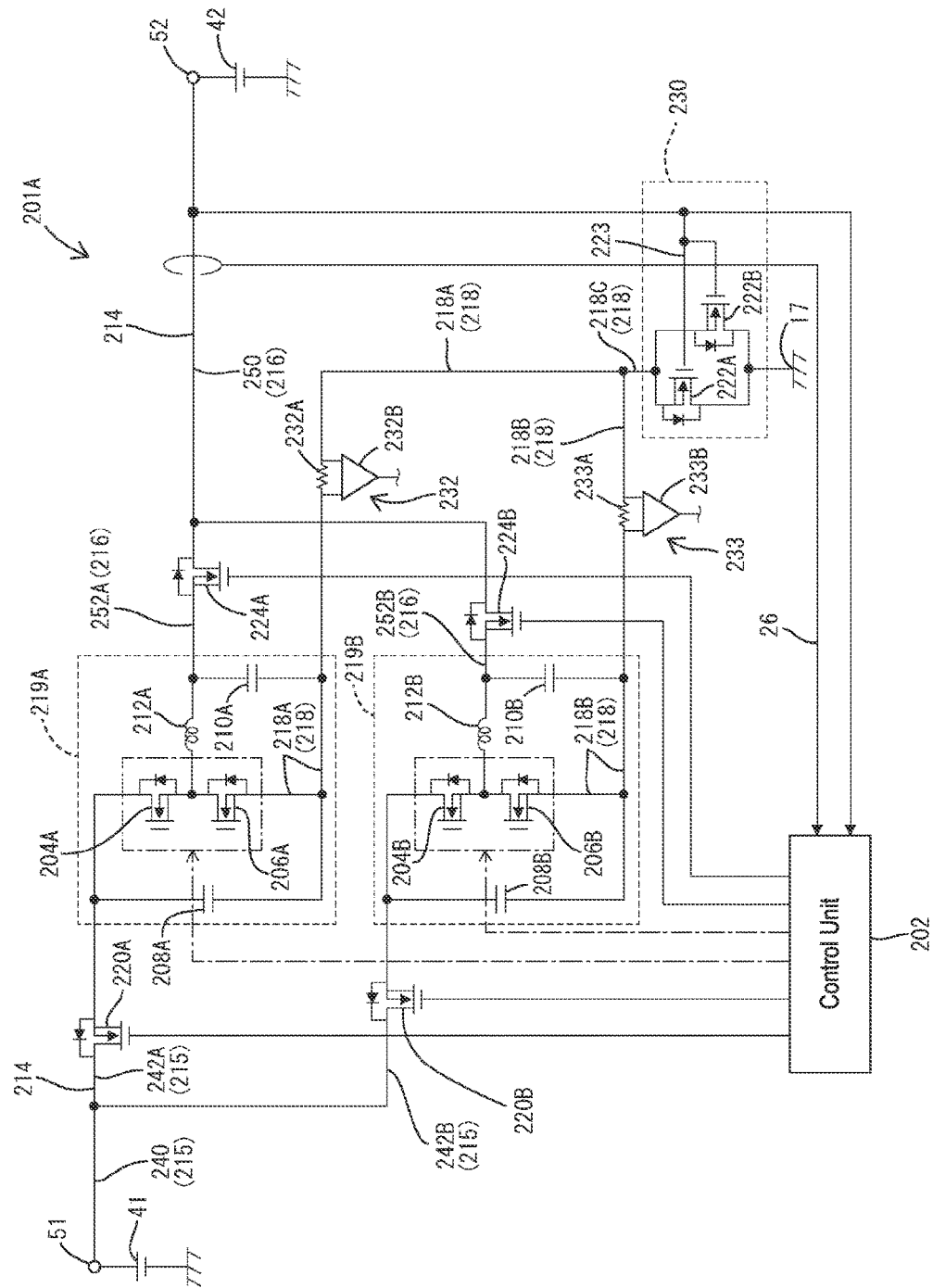
FIG. 7 is a circuit diagram schematically illustrating a DC-DC converter according to a seventh embodiment.

A DC-DC converter 201A according to the seventh embodiment shown in FIG. 7 has a configuration that is more specific than the configuration of the DC-DC converter 201 according to the sixth embodiment. The DC-DC converter 201A has all of the components and features of the above-described DC-DC converter 201 according to the sixth embodiment as well as additional components and functions. Therefore, in FIG. 7, components that are the same as those in the sixth embodiment are given reference numerals that are the same as those in FIG. 6, and detailed descriptions of the same components will be omitted. The circuit configuration of the DC-DC converter 201A according to the seventh embodiment shown in FIG. 7 is different from the circuit configuration of the DC-DC converter 201 according to the sixth embodiment shown in FIG. 6 only in that current detection units 232 and 233 are added to the third conductive path 218 and a reverse connection protection circuit unit 230 has a parallel structure, and the circuit configuration of the DC-DC converter 201A is otherwise the same as the circuit configuration of the DC-DC converter 201 according to the sixth embodiment.

In the DC-DC converter 201A shown in FIG. 7, a conductive path between the low-side switching elements 206A and 206B in the voltage conversion units 219A and 219B and the reference conductive path 17 is the third conductive path 218. The third conductive path 218 includes an individual conductive path 218A that is a path from the source of the switching element 206A to a shared conductive path 218C, and an individual conductive path 218B that is a path from the source of the switching element 206B to a shared conductive path 218C. The third conductive path 218 also includes the shared conductive path 218C that is a path between the individual conductive paths 218A and 218B and the reference conductive path 17.

The DC-DC converter 201A shown in FIG. 7 includes the reverse connection protection circuit unit 230. The DC-DC converter 201A is configured to block a current flowing from the reference conductive path 17 through the third conductive path 218 when the secondary-side power supply unit 42 is connected the wrong way round, to prevent a current from flowing to the secondary-side in the event of reverse connection. The reverse connection protection circuit unit 230 includes switching elements 222A and 222B, which are arranged in parallel in the conductive path (specifically, the shared conductive path 218C included in the third conductive path 218) between the voltage conversion units 219A and 219B and the reference conductive path 17, and a conductive path 223 that maintains the gate potential of the switching elements 222A and 222B to be equal to a potential at a predetermined position on the second conductive path 216. The switching elements 222A and 222B are configured to switch to an OFF state, in which the switching elements 222A and 222B block a current flowing in a direction from the reference conductive path 17 to the voltage conversion unit through the shared conductive path 218C, and to an ON state, in which the switching elements 222A and 222B unblock such a current. In the reverse connection protection circuit unit 230 with such a configuration, both the switching elements 222A and 222B are switched to an ON state, provided that a terminal of the secondary-side power supply unit 42 (the low-voltage side power supply unit) is in a regular connection state as shown in FIG. 7. In contrast, when the terminals of the secondary-side power supply unit 42 are in a reverse connection state in which the positive and the negative terminals are connected the wrong way round, both the switching elements 222A and 222B are maintained in an OFF state, and currents flowing from the reference conductive path 17 to the voltage conversion units 219A and 219B via the shared conductive path 218C are blocked. Note that, in the configuration shown in FIG. 7, even when the path between the secondary-side power supply unit 42 and the second conductive path 216 is in an open state, the switching elements 222A and 222B are maintained in an OFF state.

As shown in FIG. 7, the DC-DC converter 201A includes a current detection unit 232 that detects a current flowing through the conductive path (the individual conductive path 218A included in the third conductive path 218) between the source of the low-side switching element 206A in the voltage conversion unit 219A and the reference conductive path 17. The DC-DC converter 201A also includes a current detection unit 233 that detects a current flowing through the conductive path (the individual conductive path 218B included in the third conductive path 218) between the source of the low-side switching element 206B in the voltage conversion unit 219B and the reference conductive path 17. The current detection units 232 and 233 have the same configuration as that of the current detection unit 32 used in the second embodiment and so on, and detect the value of a current flowing through a resistor (a shunt resistor) using the same circuit configuration. The values detected by the current detection units 232 and 233 are input to the control unit 202 via signal lines (not shown). In the example shown in FIG. 7, one end of a resistor 232A is electrically connected to the source of the switching element 206A and the respective electrodes of the input-side capacitor 208A and the output-side capacitor 210A, and the other end of the resistor 232A is connected to the respective sources of the switching elements 222A and 222B. The total of currents flowing through the respective paths of the switching element 206A, the input-side capacitor 208A, and the output-side capacitor 210A is detected by the current detection unit 232. Similarly, one end of a resistor 233A is electrically connected to the source of the switching element 206B and the respective electrodes of the input-side capacitor 208B and the output-side capacitor 210B, and the other end of the resistor 233A is connected to the respective sources of the switching elements 222A and 222B. The total of currents flowing through the respective paths of the switching element 206B, the input-side capacitor 208B, and the output-side capacitor 210B is detected by the current detection unit 233.

The DC-DC converter 201A shown in FIG. 7 includes the same components and functions as the abnormal state detection unit included in the DC-DC converter 201 according to the sixth embodiment. Furthermore, the control unit 202 and the current detection units 232 and 233 serve as the abnormal state detection unit, and can detect the predetermined overcurrent state of a current flowing through the third conductive path 218, as an abnormal state. Specifically, the control unit 202 compares current values Ia3 and Ib3 at predetermined positions on the third conductive path 218 (the positions at which the resistor 232A and 233A are provided) with the predetermined current threshold value Ith3, based on detection values output from the current detection units 232 and 233, to determine whether or not each of the current values Ia3 and Ib3 is greater than the current threshold value Ith3. In this example, a state in which one of the current values Ia3 and Ib3 is greater than the current threshold value Ith3 is an example of the predetermined overcurrent state.

In addition, in this example, at least the control unit 202 and the switching elements 220A and 220B serve as the first protection circuit unit, and at least the control unit 202 and the switching elements 224A and 224B serve as the third protection circuit unit. In the first protection circuit unit, the plurality of switching elements 220A and 220B (the second switching elements) are respectively provided on the individual input paths 242A and 242B, and the individual input paths 242A and 242B are individually switchable to a blocked state (an OFF state in which a current flowing from the primary-side power supply unit 41 to the voltage conversion unit is blocked) and an unblocked state (an ON state). In the third protection circuit unit, the plurality of switching elements 224A and 224B (the fourth switching elements) are respectively provided on the individual output paths 252A and 252B, and the individual output paths 252A and 252B are individually switchable to a blocked state (an OFF state in which a current flowing from the secondary-side power supply unit 42 to the voltage conversion unit (a reverse flow) is blocked) and an unblocked state (an ON state). The components that serve as the first protection circuit unit and the third protection circuit unit operate to switch the switching element 220 and the switching element 224 to an OFF state (a blocked state) upon an overcurrent state of the third conductive path 218 being detected.

Specifically, the control unit 202 compares a current value Ia3 at the position at which the resistor 232A is provided (at a predetermined position on the individual conductive path 218A) with the predetermined current threshold value Ith3, based on a detection value output from the current detection unit 232, to determine whether or not Ia3>Ith3 is satisfied. Similarly, the control unit 202 compares a current value Ib3 at the position at which the resistor 233A is provided (at a predetermined position on the individual conductive path 218B) with the predetermined current threshold value Ith3, based on a detection value output from the current detection unit 233, to determine whether or not Ib3>Ith3 is satisfied. Note that the voltage conversion unit on the path through which an excessive current that is greater than the current threshold value Ith3 is an example of the voltage conversion unit that causes an abnormal state (an abnormal voltage conversion unit), and the control unit 202 and the current detection units 232 and 233 that can serve as the abnormal state detection unit have the function of detecting such an abnormal voltage conversion unit.

If an abnormal voltage conversion unit is detected by performing such a determination, the control unit 202 selectively switches the second switching elements and the fourth switching elements provided on the path of the abnormal voltage conversion unit, from among the plurality of switching elements 220A and 220B (the second switching elements) and the plurality of switching elements 224A and 224B (the fourth switching elements), to an OFF state. For example, if the individual conductive path 218A is determined as being in an overcurrent state (a state in which the current value Ia3 of the individual conductive path 218A satisfies Ia3>Ith3) based on a detection value from the current detection unit 232, and the individual conductive path 218B is determined as being in a normal state (a state in which the current value Ib3 of the individual conductive path 218B satisfies Ib3≤Ith3) based on a detection value from the current detection unit 233, the switching elements 220A and 224A provided on the path of the voltage conversion unit 219A corresponding to the individual conductive path 218A are brought into an OFF state, and the switching elements 220B and 224B provided on the path of the voltage conversion unit 219B corresponding to the individual conductive path 218B are maintained in an ON state.

With this configuration, it is possible to realize a multiphase DC-DC converter that is provided with the function of protecting a circuit from a predetermined abnormal state and the function of protecting a circuit from a reverse connection state, while further reducing conduction loss. In addition, it is possible to detect a voltage conversion unit that causes an abnormal state (an abnormal voltage conversion unit) from among the plurality of voltage conversion units 219A and 219B. If an abnormal voltage conversion unit is detected, the second switching elements and the fourth switching elements provided on the path of the abnormal voltage conversion unit can be selectively brought into an OFF state, and thus the input and the output of the corresponding phase can be reliably stopped so that protection can be realized. On the other hand, it is possible to operate voltage conversion units that are not in an abnormal state, and therefore it is possible to continue the output to the second conductive path 216. Furthermore, since it is possible to block a current flowing into the conversion unit that causes an abnormal state not only in the input-side conductive path (the individual input path) but also in the output-side conductive path (the individual output path), when a voltage conversion unit that does not cause an abnormal state is operated, the output current from the voltage conversion unit can be prevented from flowing from the individual output path of the voltage conversion unit that is to be stopped from operating (an abnormal voltage conversion unit) into the voltage conversion unit.

With the configuration shown in FIG. 7, even when a short circuit fault occurs in the input-side capacitor 208A, the switching element 206A, or the output-side capacitor 210A, for example, an excessive current flows through the resistor 232A of the current detection unit 232. Therefore, it is possible to reliably detect an excessive current in the event of a short circuit fault, and it is possible to reliably prevent a current from flowing into the inside in such an event. Similarly, even when a short circuit fault occurs in the input-side capacitor 208B, the switching element 206B, or the output-side capacitor 210B, for example, an excessive current flows through the resistor 233A of the current detection unit 233. Therefore, it is possible to reliably detect an excessive current in the event of a short circuit fault, and it is possible to reliably prevent a current from flowing into the inside in such an event.

Note that the DC-DC converter 201A according to the seventh embodiment has all of the components and features of the DC-DC converter 201 according to the sixth embodiment. Therefore, the DC-DC converter 201A has, in addition to the above-described functions, all of the functions described in the sixth embodiment (the function of protecting a circuit from an overcurrent state and an overvoltage state that occur in the power supply conductive path 214, functions that are relevant to reverse connection protection, functions that are relevant to reverse flow protection, and so on), and these functions realize the same effects as in the sixth embodiment.

Eighth Embodiment

Next, an eighth embodiment will be described, mainly with reference to FIG. 8.

Figure 8:
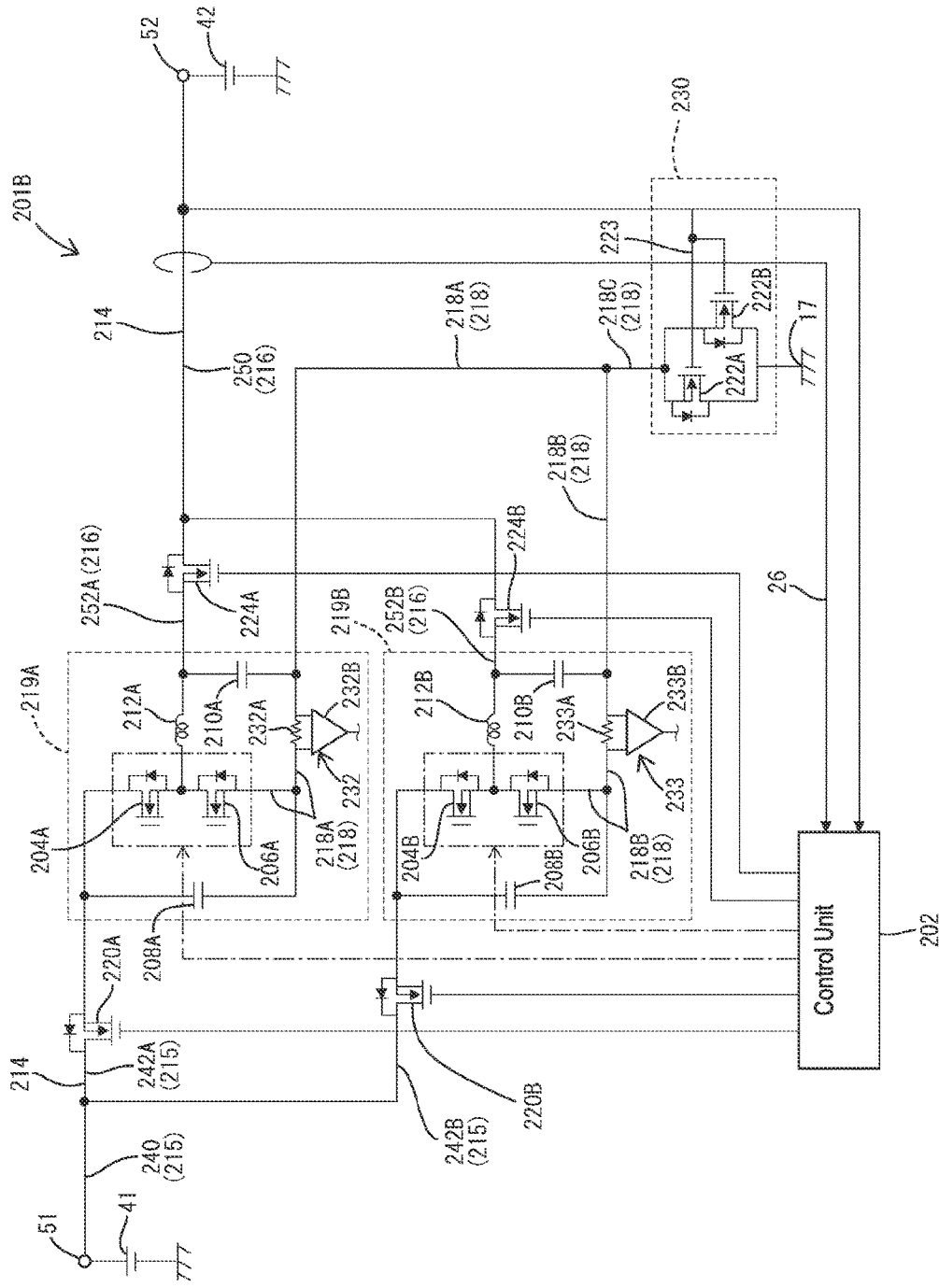
FIG. 8 is a circuit diagram schematically illustrating a DC-DC converter according to an eighth embodiment.

A DC-DC converter 201B according to the eighth embodiment shown in FIG. 8 has a configuration that is more specific than the configuration of the DC-DC converter 201 according to the sixth embodiment. The DC-DC converter 201B has all of the components and features of the above-described DC-DC converter 201 according to the sixth embodiment as well as additional components and functions. Therefore, in FIG. 8, components that are the same as those in the sixth embodiment are given reference numerals that are the same as those in FIG. 6, and detailed descriptions of the same components will be omitted. The circuit configuration of the DC-DC converter 201B according to the eighth embodiment shown in FIG. 8 is different from the circuit configuration of the DC-DC converter 201 according to the sixth embodiment shown in FIG. 6 only in that current detection units 232 and 233 are added to the third conductive path 218 and a reverse connection protection circuit unit 230 has a parallel structure, and the circuit configuration of the DC-DC converter 201B is otherwise the same as the circuit configuration of the DC-DC converter 201 according to the sixth embodiment. Note that the DC-DC converter 201B shown in FIG. 8 is different from the DC-DC converter 201A according to the seventh embodiment shown in FIG. 7 only in that the positions of the current detection units 232 and 233 are changed, and the DC-DC converter 201B is otherwise the same as the DC-DC converter 201A according to the seventh embodiment.

The DC-DC converter 201B shown in FIG. 8 includes a current detection unit 232 that detects a current flowing through the conductive path (the individual conductive path 218A included in the third conductive path 218) between the source of the low-side switching element 206A in the voltage conversion unit 219A and the reference conductive path 17. The DC-DC converter 201B also includes a current detection unit 233 that detects a current flowing through the conductive path (the individual conductive path 218B included in the third conductive path 218) between the source of the low-side switching element 206B in the voltage conversion unit 219B and the reference conductive path 17. The current detection units 232 and 233 have the same configuration as that of the current detection unit 32 used in the second embodiment and so on, and detect the value of a current flowing through a resistor (a shunt resistor) using the same circuit configuration. In the example shown in FIG. 8, one end of the resistor 232A is electrically connected to the source of the switching element 206A and an electrode of the input-side capacitor 208A, and the other end of the resistor 232A is connected to an electrode of the output-side capacitor 210A and the respective sources of the switching elements 222A and 222B. The total of currents flowing through the switching element 206A and the input-side capacitor 208A is detected by the current detection unit 232. Similarly, one end of the resistor 233A is electrically connected to the source of the switching element 206B and an electrode of the input-side capacitor 208B, and the other end of the resistor 233A is connected to an electrode of the output-side capacitor 210B and the respective sources of the switching elements 222A and 222B. The total of currents flowing through the switching element 206B and the input-side capacitor 208B is detected by the current detection unit 233.

The DC-DC converter 201B shown in FIG. 8 also includes the same components and functions as the abnormal state detection unit included in the DC-DC converter 201 according to the sixth embodiment. Furthermore, the control unit 202 and the current detection units 232 and 233 serve as the abnormal state detection unit in the same manner as in the seventh embodiment, the control unit 202 and the switching elements 220A and 220B serve as the first protection circuit unit as in the seventh embodiment, and the control unit 202 and the switching elements 224A and 224B serve as the third protection circuit unit as in the seventh embodiment.

The control unit 202 compares the current value Ia3 at the position at which the resistor 232A is provided (at a predetermined position on the individual conductive path 218A) with the predetermined current threshold value Ith3, based on a detection value output from the current detection unit 232, to determine whether or not Ia3>Ith3 is satisfied. Similarly, the control unit 202 compares the current value Ib3 at the position at which the resistor 233A is provided (at a predetermined position on the individual conductive path 218B) with the predetermined current threshold value Ith3, based on a detection value output from the current detection unit 233, to determine whether or not Ib3>Ith3 is satisfied. Note that the voltage conversion unit on the path through which an excessive current that is greater than the current threshold value Ith3 is an example of the voltage conversion unit that causes an abnormal state (an abnormal voltage conversion unit), and the control unit 202 and the current detection units 232 and 233 that can serve as the abnormal state detection unit have the function of detecting such an abnormal voltage conversion unit.

If an abnormal voltage conversion unit is detected by performing such a determination, the control unit 202 selectively switches the second switching elements and the fourth switching elements provided on the path of the abnormal voltage conversion unit, from among the plurality of switching elements 220A and 220B (the second switching elements) and the plurality of switching elements 224A and 224B (the fourth switching elements), to an OFF state. For example, if the individual conductive path 218A is determined as being in an overcurrent state (a state in which the current value Ia3 of the individual conductive path 218A satisfies Ia3>Ith3) based on a detection value from the current detection unit 232, and the individual conductive path 218B is determined as being in a normal state (a state in which the current value Ib3 of the individual conductive path 218B satisfies Ib3≤Ith3) based on a detection value from the current detection unit 233, the switching elements 220A and 224A provided on the path of the voltage conversion unit 219A corresponding to the individual conductive path 218A are brought into an OFF state, and the switching elements 220B and 224B provided on the path of the voltage conversion unit 219B corresponding to the individual conductive path 218B are maintained in an ON state.

The above-described configuration also realizes the same effects as in the seventh embodiment.

The DC-DC converter 201B according to the eighth embodiment has all of the components and features of the DC-DC converter 201 according to the sixth embodiment. Therefore, the DC-DC converter 201B has, in addition to the above-described functions, all of the functions described in the sixth embodiment (the function of protecting a circuit from an overcurrent state and an overvoltage state that occur in the power supply conductive path 214, functions that are relevant to reverse connection protection, functions that are relevant to reverse flow protection, and so on), and these functions realize the same effects as in the sixth embodiment.

Ninth Embodiment

Next, a ninth embodiment will be described, mainly with reference to FIG. 9.

Figure 9:
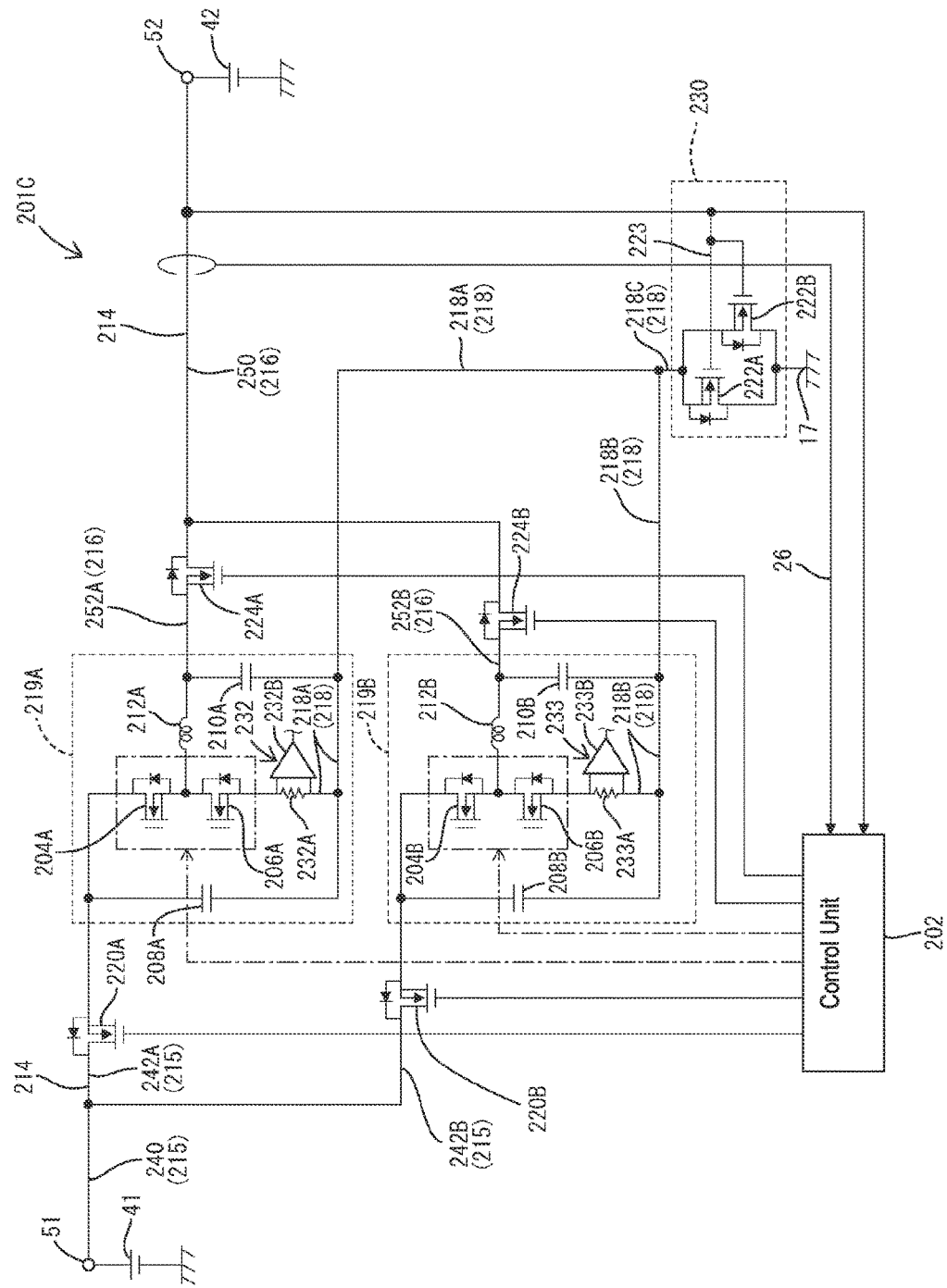
FIG. 9 is a circuit diagram schematically illustrating a DC-DC converter according to a ninth embodiment.

A DC-DC converter 201C according to the ninth embodiment shown in FIG. 9 has a configuration that is more specific than the configuration of the DC-DC converter 201 according to the sixth embodiment. The DC-DC converter 201C has all of the components and features of the above-described DC-DC converter 201 according to the sixth embodiment as well as additional components and functions. Therefore, in FIG. 9, components that are the same as those in the sixth embodiment are given reference numerals that are the same as those in FIG. 6, and detailed descriptions of the same components will be omitted. The circuit configuration of the DC-DC converter 201C according to the ninth embodiment shown in FIG. 9 is different from the circuit configuration of the DC-DC converter 201 according to the sixth embodiment shown in FIG. 6 only in that current detection units 232 and 233 are added to the third conductive path 218 and a reverse connection protection circuit unit 230 has a parallel structure, and the circuit configuration of the DC-DC converter 201C is otherwise the same as the circuit configuration of the DC-DC converter 201 according to the sixth embodiment. Note that the DC-DC converter 201C shown in FIG. 9 is different from the DC-DC converter 201A according to the seventh embodiment shown in FIG. 7 only in that the positions of the current detection units 232 and 233 are changed, and the DC-DC converter 201C is otherwise the same as the DC-DC converter 201A according to the seventh embodiment.

The DC-DC converter 201C shown in FIG. 9 includes the current detection unit 232 that detects a current flowing through the conductive path (the individual conductive path 218A included in the third conductive path 218) between the source of the low-side switching element 206A in the voltage conversion unit 219A and the reference conductive path 17. The DC-DC converter 201C also includes the current detection unit 233 that detects a current flowing through the conductive path (the individual conductive path 218B included in the third conductive path 218) between the source of the low-side switching element 206B in the voltage conversion unit 219B and the reference conductive path 17. The current detection units 232 and 233 have the same configuration as that of the current detection unit 32 used in the second embodiment and so on, and detect the value of a current flowing through a resistor (a shunt resistor) using the same circuit configuration. In the example shown in FIG. 9, one end of the resistor 232A is electrically connected to the source of the switching element 206A, and the other end of the resistor 232A is electrically connected to the respective electrodes of the input-side capacitor 208A and the output-side capacitor 210A and the respective sources of the switching elements 222A and 222B. A current flowing through the switching element 206A is detected by the current detection unit 232. Similarly, one end of the resistor 233A is electrically connected to the source of the switching element 206B, and the other end of the resistor 233A is connected to the respective electrodes of the input-side capacitor 208B and the output-side capacitor 210B and the respective sources of the switching elements 222A and 222B. A current flowing through the switching element 206B is detected by the current detection unit 233.

The DC-DC converter 201C shown in FIG. 9 also includes the same components and functions as the abnormal state detection unit included in the DC-DC converter 201 according to the sixth embodiment. Furthermore, the control unit 202 and the current detection units 232 and 233 serve as the abnormal state detection unit in the same manner as in the seventh embodiment, the control unit 202 and the switching elements 220A and 220B serve as the first protection circuit unit as in the seventh embodiment, and the control unit 202 and the switching elements 224A and 224B serve as the third protection circuit unit as in the seventh embodiment.

The control unit 202 compares the current value Ia3 at the position at which the resistor 232A is provided (at a predetermined position on the individual conductive path 218A) with the predetermined current threshold value Ith3, based on a detection value output from the current detection unit 232, to determine whether or not Ia3>Ith3 is satisfied. Similarly, the control unit 202 compares the current value Ib3 at the position at which the resistor 233A is provided (at a predetermined position on the individual conductive path 218B) with the predetermined current threshold value Ith3, based on a detection value output from the current detection unit 233, to determine whether or not Ib3>Ith3 is satisfied. Note that the voltage conversion unit on the path through which an excessive current that is greater than the current threshold value Ith3 is an example of the voltage conversion unit that causes an abnormal state (an abnormal voltage conversion unit), and the control unit 202 and the current detection units 232 and 233 that can serve as the abnormal state detection unit have the function of detecting such an abnormal voltage conversion unit.

If an abnormal voltage conversion unit is detected by performing such a determination, the control unit 202 selectively switches the second switching elements and the fourth switching elements provided on the path of the abnormal voltage conversion unit, from among the plurality of switching elements 220A and 220B (the second switching elements) and the plurality of switching elements 224A and 224B (the fourth switching elements), to an OFF state. For example, if the individual conductive path 218A is determined as being in an overcurrent state (a state in which the current value Ia3 of the individual conductive path 218A satisfies Ia3>Ith3) based on a detection value from the current detection unit 232, and the individual conductive path 218B is determined as being in a normal state (a state in which the current value Ib3 of the individual conductive path 218B satisfies Ib3≤Ith3) based on a detection value from the current detection unit 233, the switching elements 220A and 224A provided on the path of the voltage conversion unit 219A corresponding to the individual conductive path 218A are brought into an OFF state, and the switching elements 220B and 224B provided on the path of the voltage conversion unit 219B corresponding to the individual conductive path 218B are maintained in an ON state.

The above-described configuration also realizes the same effects as in the seventh embodiment.

The DC-DC converter 201C according to the ninth embodiment has all of the components and features of the DC-DC converter 201 according to the sixth embodiment. Therefore, the DC-DC converter 201C has, in addition to the above-described functions, all of the functions described in the sixth embodiment (the function of protecting a circuit from an overcurrent state and an overvoltage state that occur in the power supply conductive path 214, functions that are relevant to reverse connection protection, functions that are relevant to reverse flow protection, and so on), and these functions realize the same effects as in the sixth embodiment.

Tenth Embodiment

Figure 10:
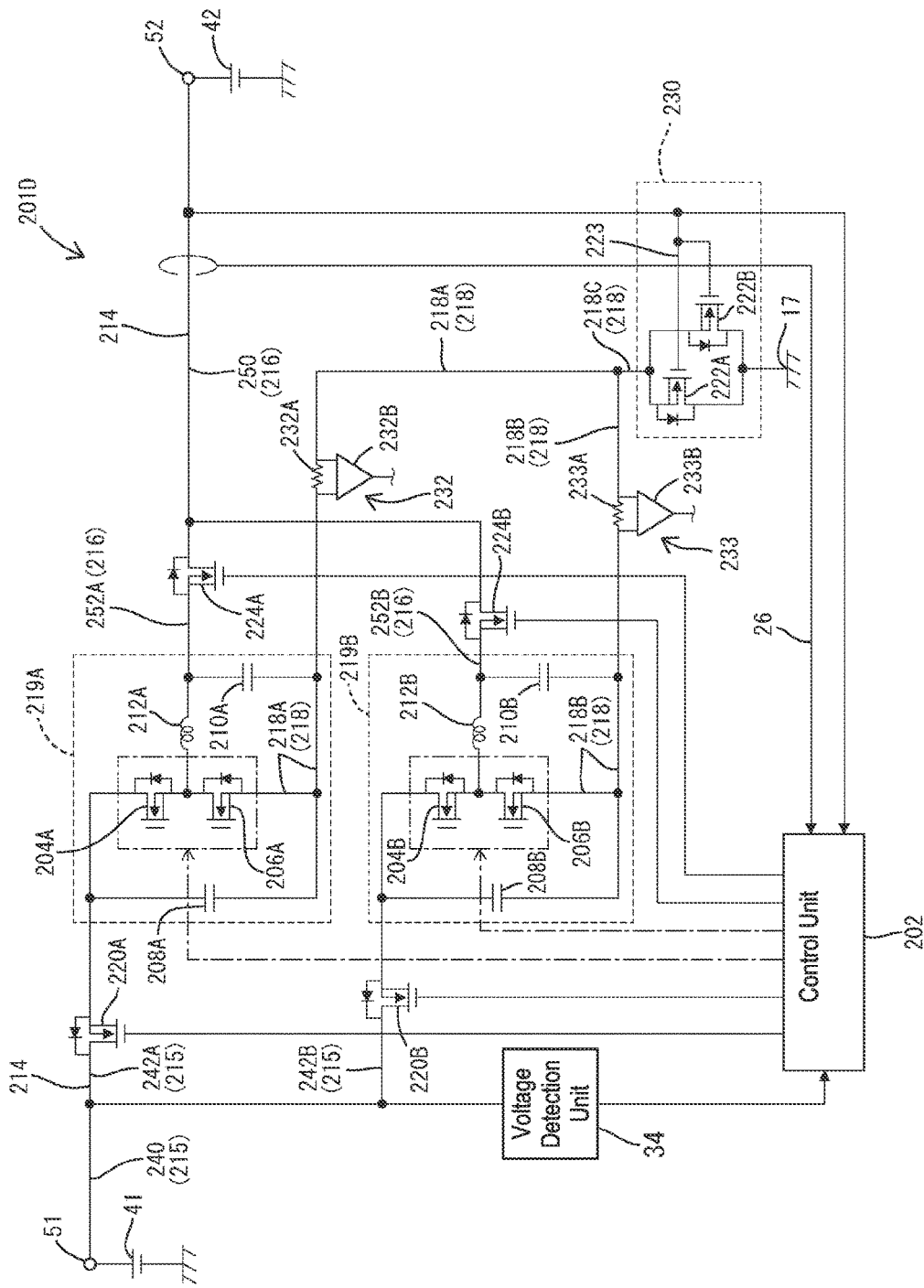
FIG. 10 is a circuit diagram schematically illustrating a DC-DC converter according to a tenth embodiment.

A DC-DC converter 201D according to the tenth embodiment shown in FIG. 10 has all of the components and features of the above-described DC-DC converter 201A according to the seventh embodiment, as well as additional components and functions. Therefore, in FIG. 10, components that are the same as those in the seventh embodiment are given reference numerals that are the same as those in FIG. 7, and detailed descriptions of the same components will be omitted. Note that the circuit configuration of the DC-DC converter 201D according to the tenth embodiment shown in FIG. 10 is different from the circuit configuration according to the seventh embodiment shown in FIG. 7 only in that a voltage on the first conductive path 215 can be detected, and the circuit configuration of the DC-DC converter 201D is otherwise the same as the circuit configuration of the DC-DC converter 201A according to the seventh embodiment.

The DC-DC converter 201D shown in FIG. 10 includes the voltage detection unit 34 that detects a voltage on the first conductive path 215. The voltage detection unit 34 is the same as the voltage detection unit 34 (FIG. 5) used in the fifth embodiment, is configured as a well-known voltage detection circuit, and is configured to input a detection value that corresponds to the value of a voltage on the first conductive path 215 (such as a divided voltage value obtained by dividing a voltage on the first conductive path 215, using a voltage divider circuit), to the control unit 202.

In this configuration, at least the voltage detection unit 34 and the control unit 202 constitute an example of the abnormal state detection unit, and function to detect the predetermined overvoltage state of at least the first conductive path 215 as an abnormal state. Specifically, the control unit 202 compares the value V1 of a voltage across the first conductive path 215 with the predetermined threshold value Vth1, based on a detection value obtained by the voltage detection unit 34. If V1≤Vth1 is satisfied, the control unit 202 determines that the first conductive path 215 is not in an overvoltage state, and if V1>Vth1 is satisfied, the control unit 202 determines that the first conductive path 215 is in an overvoltage state. Thus, the control unit 202 detects an abnormal state of the power supply conductive path 215. In this example, the state in which V1>Vth1 is satisfied is an example of the predetermined overvoltage state.

In the DC-DC converter 201D shown in FIG. 10, at least the control unit 202 and the switching elements 220A and 220B serve as the first protection circuit unit, and operate to switch the switching elements 220A and 220B (the second switching elements) to an OFF state upon an overvoltage state of the first conductive path 215 being detected. Specifically, upon determining that V1>Vth1 is satisfied, the control unit 202 outputs an OFF signal to the switching elements 220A and 220B to switch either one or all of the switching elements 220A and 220B to an OFF state. In the case of switching all of the switching elements 220A and 220B to an OFF state, the control unit 202 may maintain all of the switching elements 224A and 224B in an OFF state.

Note that the DC-DC converter 201D shown in FIG. 10 also has all of the components and features of the DC-DC converter 201A according to the seventh embodiment. Therefore, the DC-DC converter 201D has, in addition to the above-described functions, all of the functions described in the sixth and seventh embodiments (the function of protecting a circuit from an overcurrent state and an overvoltage state that occur in the power supply conductive path 214, functions that are relevant to reverse connection protection, functions that are relevant to reverse flow protection, the function of protecting a circuit from an overcurrent state that occurs in the third conductive path 218, and so on), and these functions realize the same effects as in the seventh embodiment.

Other Embodiments

The present invention is not limited to the embodiments illustrated with reference to the descriptions above and the drawings, and, for example, the following embodiments are included in the technical scope of the present invention.

The primary-side power supply unit 41 and the secondary-side power supply unit 42 in the above-described embodiments are merely specific examples. The type of the power storage means and voltages to be generated are not limited to the examples above, and may be variously modified. Also, any of the embodiments may be modified to be of a diode rectification type.

(2) In the examples shown in FIGS. 1 to 10, a generator and a load that are connected to the first conductive path and the second conductive path are omitted. However, various devices and electronic parts may be connected to the first conductive path and the second conductive path.

(3) In the sixth to tenth embodiments shown in FIGS. 6 to 10, the DC-DC converter 201 that has a two-phase structure in which two voltage conversion units 219A and 219B are connected in parallel has been illustrated. However, the DC-DC converter 201 may have a three or more-phase structure in which three or more voltage conversion units are connected in parallel. With such a configuration, when a short circuit state has occurred, the second switching element can be switched to an OFF state with respect to only the path in which a short circuit state has occurred, and thus a step down operation performed by the voltage conversion unit on the path can be stopped.

(4) In the sixth to tenth embodiments shown in FIGS. 6 to 10, the switching elements 220A and 220B for short circuit protection are respectively provided for the plurality of individual input paths 242A and 242B. However, it is possible to reduce the number of elements by providing only one switching element for the shared input path 240.

(5) In the sixth to tenth embodiments shown in FIGS. 6 to 10, the switching elements 224A and 224B for reverse flow protection are respectively provided for the plurality of individual output paths 252A and 252B. However, it is possible to reduce the number of elements by providing only one switching element for the shared output path 250.

(6) In the first to fifth embodiments shown in FIGS. 1 to 5, instead of current detection performed by the current detection path 26 or in combination with current detection performed by the current detection path 26, a current flowing through the switching element 22 may be detected and at least one of the switching element 20 and the switching element 24 may be switched to an OFF state when a current flowing through the switching element 22 is in a predetermined overcurrent state. For example, a potential difference across the switching element 22, i.e. the potential difference between the source and the drain of the switching element 22 may be detected, and when the potential difference across the switching element 22 is greater than or equal to a predetermined threshold value, it may be determined that a current flowing through the switching element 22 is in an overcurrent state and at least one of the switching element 20 and the switching element 24 may be switched to an OFF state. Specifically, the switching element 20 may be switched to an OFF state when the potential difference across the switching element 22 is greater than or equal to a predetermined threshold value, or the switching element 24 may be switched to an OFF state when the potential difference across the switching element 22 is greater than or equal to a predetermined threshold value. Alternatively, both the switching elements 20 and 24 may be switched to an OFF state when the potential difference across the switching element 22 is greater than or equal to a predetermined threshold value. With such a configuration, it is possible to determine whether or not an overcurrent state has occurred in the switching element 22 by using the switching element 22 as an element for current detection as well, and thus some or all of dedicated elements for current detection may be omitted from the path. A similar configuration may be added to the sixth to tenth embodiments shown in FIGS. 6 to 10. For example, the potential difference across the switching element 22 (or the switching elements 222A and 222B in the seventh to tenth embodiments), i.e. the potential difference between the source and the drain of the switching element 22 may be detected, and all of the plurality of input-side switching elements 220A and 220B may be switched to an OFF state when the potential difference across the switching element 22 is greater than or equal to a predetermined threshold value, or all of the plurality of output-side switching elements 222A and 222B may be switched to an OFF state when the potential difference across the switching element 22 is greater than or equal to a predetermined threshold value. Alternatively, all of the switching elements 220A, 220B, 222A, and 222B may be switched to an OFF state when the potential difference across the switching element 22 is greater than or equal to a predetermined threshold value. Note that the method for detecting a current flowing through the switching element 22 is not limited the above-described method. For example, when a potential difference across the entirety of a set of elements composed of the switching element 22 and one or more elements that are connected to the switching element 22 in series (a voltage drop that occurs in the entirety of the set of elements) is greater than or equal to a predetermined threshold vale, it may be determined that a current flowing through the switching element 22 is in an overcurrent state and the above-described protection operations may be performed.

(7) In the first to tenth embodiments, a current flowing through the second conductive path is detected by the current detection path 26 that is provided with a well-known current detection circuit. However, a current flowing the first conductive path may be detected by a well-known current detection circuit, and the current value of the first conductive path may be input to the control unit. In this case, when the current value of the first conductive path is in a overcurrent state in which the current value is greater than a predetermined current threshold value, the control unit may perform protection operations in the same manner as when performing protection operations in the case where an excessive current has occurred in the second conductive path in the first to tenth embodiments.

(8) Although the fifth embodiment shows an example in which the function of detecting a voltage across the first conductive path 15 is added to the configuration of the second embodiment and the switching element 20 (the second switching element) is switched to an OFF state upon an excessive voltage being detected from the first conductive path 15, such a function may be added to the configuration of any of the first, third, and fourth embodiments. Similarly, although the tenth embodiment shows an example in which the function of detecting a voltage across the first conductive path 215 is added to the configuration of the seventh embodiment and the switching elements 220A and 220B (the second switching elements) are switched to an OFF state upon an excessive voltage being detected from the first conductive path 215, such a function may be added to the configuration of any of the sixth, eighth, and ninth embodiments.

(9) In any of the examples shown in the first to fifth embodiments and the modifications thereof, the control unit 2 may function to switch all of the switching elements 20 and fourth switching elements 24 to an OFF state when the current value of the second conductive path 16 is in an overcurrent state in which the current value is greater than a threshold value.

(10) In any of the examples shown in the first to fifth embodiments and the modifications thereof, the control unit 2 may function to switch all of the switching elements 20 and fourth switching elements 24 to an OFF state when the voltage value of the second conductive path 16 is in an overvoltage state in which the voltage value is greater than a threshold value.

(11) The function of detecting the voltage value of the first conductive path 15 may be added to any of the examples shown in the first to fifth embodiments and the modifications thereof. Furthermore, the control unit 2 may function to switch both the second switching element 20 and the fourth switching element 24 to an OFF state when the voltage value of the first conductive path 15 is in an overvoltage state in which the voltage value is greater than a threshold value.

The function of detecting the current value of the first conductive path 15 may be added to any of the examples shown in the first to fifth embodiments and the modifications thereof. Furthermore, the control unit 2 may function to switch both the second switching element 20 and the fourth switching element 24 to an OFF state when the current value of the first conductive path 15 is in an overcurrent state in which the current value is greater than a threshold value.

(13) In any of the examples shown in the sixth to tenth embodiments and the modifications thereof, the control unit 202 may function to switch all of the second switching elements 220A and 220B and the fourth switching elements 224A and 224B when the current value of the shared output path 250 is in an overcurrent state in which the current value is greater than a threshold value.

(14) In any of the examples shown in the sixth to tenth embodiments and the modifications thereof, the control unit 202 may function to switch all of the second switching elements 220A and 220B and the fourth switching elements 224A and 224B when the voltage value of the shared output path 250 is in an overvoltage state in which the voltage value is greater than a threshold value.

(15) The function of detecting the current value of the shared input path 240 may be added to any of the examples shown in the sixth to tenth embodiments and the modifications thereof. The control unit 202 may function to switch all of the second switching elements 220A and 220B and the fourth switching elements 224A and 224B to an OFF state when the current value of the shared input path 240 is in an overcurrent state in which the current value is greater than a threshold value.

(16) The function of detecting the voltage value of the shared input path 240 may be added to any of the examples shown in the sixth to tenth embodiments and the modifications thereof. The control unit 202 may function to switch all of the second switching elements 220A and 220B and the fourth switching elements 224A and 224B to an OFF state when the voltage value of the shared input path 240 is in an overvoltage state in which the voltage value is greater than a threshold value.

(17) The function of detecting the current value or the voltage value of the shared conductive path 218C may be added to any of the examples shown in the sixth to tenth embodiments and the modifications thereof. The control unit 202 may function to switch all of the second switching elements 220A and 220B and the fourth switching elements 224A and 224B to an OFF state when the current value or the voltage value of the shared input path 240 is in an overcurrent state or an overvoltage state in which the current value or the voltage value is greater than a threshold value.

The invention claimed is:

1. A DC-DC converter comprising:
a voltage conversion unit that includes a first switching element, is provided between a first conductive path that is electrically connected to a high-potential side terminal of a primary-side power supply unit and a second conductive path that is electrically connected to a high-potential side terminal of a secondary-side power supply unit, converts a voltage applied to the first conductive path by switching the first switching element between an ON state and an OFF state, and outputs the resulting voltage to the second conductive path;
an abnormal state detection unit that detects a predetermined abnormal state of a current flowing through the second conductive path;
a first protection circuit that includes a second switching element unit that is provided on a high-voltage side conductive path, out of the first conductive path and the second conductive path, and switches between an OFF state, in the OFF state the second switching element blocks at least a current flowing in a direction toward the voltage conversion unit, and an ON state, in the ON state the second switching element releases the blocking allowing current to flow to the voltage conversion unit, the first protection circuit unit switching the second switching element to an OFF state upon the abnormal state detection unit detecting the abnormal state so as to block at least some of the current flowing in the direction toward the voltage conversion unit; and
a second protection circuit unit that includes a third switching element that is provided on a third conductive path that is located between the voltage conversion unit and a reference conductive path that is maintained at a predetermined reference potential that is lower than the potential of the first conductive path and the potential of the second conductive path, the reference path and the second conductive path being connected in parallel to the first conductive path, and switches between an OFF state, in which the third switching element blocks at least a current flowing from the reference conductive path, and an ON state, in which the third switching element releases the blocking, the second protection circuit unit switching the third switching element to an ON state if a terminal of at least a low-voltage side power supply unit, out of the primary-side power supply unit and the secondary-side power supply unit, is in a regular connection state, and switching the third switching element to an OFF state if the terminal of at least the low-voltage side power supply unit is in a reverse connection state.

2. The DC-DC converter according to claim 1, wherein the abnormal state detection unit detects, as the abnormal state, a predetermined overcurrent state of a current flowing through at least one of the first conductive path and the second conductive path, and the first protection circuit unit switches the second switching element to an OFF state upon the abnormal state detection unit detecting that at least one of the first conductive path and the second conductive path is in the overcurrent state.

3. The DC-DC converter according to claim 1, wherein the secondary-side power supply unit is configured as the low-voltage side power supply unit, the primary-side power supply unit is configured as a high-voltage side power supply unit, and the voltage conversion unit is configured to step down a DC voltage applied to the first conductive path and output the resulting voltage to the second conductive path, the abnormal state detection unit detects, as the abnormal state, a predetermined overvoltage state of at least the first conductive path, and the first protection circuit unit switches the second switching element to an OFF state upon the abnormal state detection unit detecting an overvoltage state of the first conductive path.

4. The DC-DC converter according to claim 1, wherein the secondary-side power supply unit is configured as the low-voltage side power supply unit, the primary-side power supply unit is configured as the high-voltage side power supply unit, and the voltage conversion unit is configured to step down a DC voltage applied to the first conductive path and output the resulting voltage to the second conductive path, the abnormal state detection unit detects, as the abnormal state, a predetermined overvoltage state of at least the second conductive path, and the first protection circuit unit switches the second switching element to an OFF state upon the abnormal state detection unit detecting an overvoltage state of the second conductive path.

5. The DC-DC converter according to claim 1, wherein the abnormal state detection unit detects, as the abnormal state, a predetermined overcurrent state of a current flowing through the third conductive path, and the first protection circuit unit switches the second switching element to an OFF state upon the abnormal state detection unit detecting an overcurrent state of the third conductive path.

6. The DC-DC converter according to claim 2, further comprising:

a fourth switching element that is located on a low-voltage side conductive path out of the first conductive path and the second conductive path, and switches between an OFF state, in which the fourth switching element blocks at least a current flowing in a direction toward the voltage conversion unit, and an ON state, in which the fourth switching element releases the blocking, wherein the abnormal state detection unit detects, as the abnormal state, at least one of a predetermined overcurrent state and a predetermined overvoltage state of at least one of the first conductive path, the second conductive path, and the third conductive path, and the first protection circuit unit switches the second switching element and the fourth switching element to an OFF state upon the abnormal state detection unit detecting an overcurrent state or an overvoltage state of at least one of the first conductive path, the second conductive path, and the third conductive path.

7. The DC-DC converter according to claim 1, wherein the secondary-side power supply unit is configured as the low-voltage side power supply unit, the primary-side power supply unit is configured as the high-voltage side power supply unit, and the voltage conversion unit is configured to step down a DC voltage applied to the first conductive path and output the resulting voltage to the second conductive path, the second switching element of the first protection circuit unit is provided on the first conductive path, and the DC-DC converter further comprises a third protection circuit unit that includes a fourth switching element that is provided on the second conductive path and switches between an OFF state, in which the fourth switching element blocks a current flowing in a reverse direction toward the voltage conversion unit, and an ON state, in which the fourth switching element releases the blocking, the third protection circuit unit switching the fourth switching element to an OFF state upon the second conductive path entering a reverse flow state.

8. The DC-DC converter according to claim 7, wherein the abnormal state detection unit detects, as the abnormal state, a predetermined overcurrent state of a current flowing through the third conductive path, and the first protection circuit unit and the third protection circuit unit switches the second switching element and the fourth switching element to an OFF state upon the abnormal state detection unit detecting an overcurrent state of the third conductive path.

9. The DC-DC converter according to claim 1, wherein a plurality of the voltage conversion units that step down a DC voltage applied to the first conductive path and output the resulting voltage to the second conductive path are provided in parallel between the first conductive path and the second conductive path, the first conductive path includes a shared input path that is electrically connected to a high-potential side terminal of the primary-side power supply unit, and a plurality of individual input paths that branch off from the shared input path and are respectively connected to the voltage conversion units, the second conductive path includes a plurality of individual output paths that are respectively connected to the plurality of voltage conversion units, and a shared output path to which the plurality of individual output paths are commonly connected and that is electrically connected to a high-potential side terminal of the secondary-side power supply unit, and the first protection circuit unit includes a plurality of the second switching elements that are respectively provided on the individual input paths, and the individual input paths are individually switchable to an OFF state and an ON state.

10. The DC-DC converter according to claim 7, wherein a plurality of the voltage conversion units that step down a DC voltage applied to the first conductive path and output the resulting voltage to the second conductive path are provided in parallel between the first conductive path and the second conductive path, the first conductive path includes a shared input path that is electrically connected to a high-potential side terminal of the primary-side power supply unit, and a plurality of individual input paths that branch off from the shared input path and are respectively connected to the voltage conversion units, the second conductive path includes a plurality of individual output paths that are respectively connected to the plurality of voltage conversion units, and a shared output path to which the plurality of individual output paths are commonly connected and that is electrically connected to a high-potential side terminal of the secondary-side power supply unit, the first protection circuit unit includes a plurality of the second switching elements that are respectively provided on the individual input paths, and the individual input paths are individually switchable to an OFF state and an ON state, the third protection circuit unit includes a plurality of the fourth switching elements that are respectively provided on the individual output paths, and the individual output paths are individually switchable to an OFF state and an ON state, the abnormal state detection unit detects an abnormal voltage conversion unit that causes the abnormal state, from among the plurality of voltage conversion units, and upon the abnormal state detection unit detecting the abnormal voltage conversion unit, the first protection circuit unit and the third protection circuit unit selectively switch the second switching elements and the fourth switching elements provided on the path of the abnormal voltage conversion unit, out of the plurality of second switching elements and the plurality of fourth switching elements, to an OFF state.

11. The DC-DC converter according to claim 9 or 10, further comprising:

an operation control unit that sequentially operates the plurality of voltage conversion units, wherein if the abnormal state detection unit detects the abnormal state while one of the plurality of voltage conversion units is operating, and the abnormal state detection unit does not detect the abnormal state while another one of the plurality of voltage conversion units is operating, the first protection circuit unit selectively switches the second switching element on the individual input path that is an input path to the one of the plurality of voltage conversion units from which the abnormal state is detected, into an OFF state, and maintains the second switching element on the individual input path that is an input path to the other voltage conversion unit from which an abnormal state is not detected, in an ON state.

* * * * *